United States Patent
Tanaka et al.

(10) Patent No.: US 7,426,377 B2
(45) Date of Patent: Sep. 16, 2008

(54) SIGMA DELTA (ΣΔ) TRANSMITTER CIRCUITS AND TRANSCEIVER USING THE SAME

(75) Inventors: Satoshi Tanaka, Kokubunji (JP); Kazuyuki Hori, Tokyo (JP); Manabu Kawabe, Hachioji (JP); Yukinori Akamine, Kokubunji (JP); Masumi Kasahara, Takasaki (JP); Kazuo Watanabe, Takasaki (JP)

(73) Assignee: Renesas Technology Corp., Tokyo (JP)

( * ) Notice: Subject to any disclaimer, the term of this patent is extended or adjusted under 35 U.S.C. 154(b) by 428 days.

(21) Appl. No.: 11/207,003

(22) Filed: Aug. 19, 2005

(65) Prior Publication Data

US 2006/0121858 A1 Jun. 8, 2006

(30) Foreign Application Priority Data

Sep. 9, 2004 (JP) .............................. 2004-262892

(51) Int. Cl.
 *H04B 1/06* (2006.01)
(52) U.S. Cl. ...................... 455/255; 455/180.3; 455/260
(58) Field of Classification Search .................. 455/76, 455/102, 132, 180.3, 188.1, 196.1, 255, 256, 455/257, 258, 259, 260, 265, 318, 323
See application file for complete search history.

(56) References Cited

U.S. PATENT DOCUMENTS

| 6,008,703 | A | 12/1999 | Perrott et al. | |
|---|---|---|---|---|
| 6,785,525 | B2 * | 8/2004 | Ries | 455/258 |
| 6,900,700 | B2 * | 5/2005 | Oosawa et al. | 331/46 |
| 7,092,676 | B2 * | 8/2006 | Abdelgany et al. | 455/76 |
| 7,146,143 | B2 * | 12/2006 | Oosawa et al. | 455/245.1 |
| 2002/0049046 | A1 * | 4/2002 | Audinot | 455/255 |
| 2003/0193923 | A1 * | 10/2003 | Abdelgany et al. | 370/342 |
| 2004/0077327 | A1 * | 4/2004 | Lim et al. | 455/318 |
| 2005/0059372 | A1 * | 3/2005 | Arayashiki et al. | 455/252.1 |
| 2005/0119025 | A1 * | 6/2005 | Mohindra et al. | 455/552.1 |
| 2005/0266805 | A1 * | 12/2005 | Jensen | 455/82 |
| 2007/0010225 | A1 * | 1/2007 | Oosawa et al. | 455/255 |

FOREIGN PATENT DOCUMENTS

JP 2001-517013 10/2001
WO 99/14859 3/1999

OTHER PUBLICATIONS

RF Micro Devices, "Polaris™ Total Radio Solution", 2000.

* cited by examiner

*Primary Examiner*—Blane J Jackson
(74) *Attorney, Agent, or Firm*—Miles & Stockbridge P.C.

(57) ABSTRACT

A ΣΔ transmitter that permits setting of a loop filter LF, a charge pump current and other factors to the same conditions even if it is operated in a plurality of frequency bands, therefore allows the number of components to be reduced and at the same time enables the angle between the phases of local signals for reception use to be close to exactly 90°, which is a feature ensuring robustness against inter-element variations and accordingly suitable for large scale integration, is to be provided. The oscillation frequency of a VCO is set to an even-number multiple of the transmit frequency, and generates transmit signals via a divider. A device that varies the gain according to the amplitude component of modulating signals is added to an amplifier whose input is signals from the VCO, and the transmission of modulating signals involving amplitude modulation, such as EDGE, is thereby made possible.

10 Claims, 17 Drawing Sheets

US 7,426,377 B2

SIGMA DELTA (ΣΔ) TRANSMITTER CIRCUITS AND TRANSCEIVER USING THE SAME

CLAIM OF PRIORITY

The present application claims priority from Japanese application JP 2004-262892 filed on Sep. 9, 2004, the contents of which is hereby incorporated by reference into this application.

FIELD OF THE INVENTION

The present invention relates to a mobile terminal which permits a reduction in the number of constituent parts, and more particularly to a transmitter using the sigma delta (ΣΔ) system suitable for large-scale integration and a transceiver using it.

BACKGROUND OF THE INVENTION

Along with the explosively expanding use of mobile terminals, demands are intensifying for their reductions in size and cost. To meet these demands, it is urged to apply integrated circuits (ICs) having fewer voltage controlled oscillators (VCOs) and filters and enhanced in the scale of integration. One example of an IC set for transceiver use increased in the scale of integration has a configuration illustrated in FIG. 15. It was introduced in 2000 by RF Micro Devices.

This example of the prior art is the set of modules and LSIs integrating an antenna switch filter module 108 comprising a receive band pass filter 1, a switch (S/W) 35 and a transmit low pass filter (LPF) 34; a power amplifier module 33 comprising an amplifier 106 covering a 1 GHz-or-below frequency range of GSM and GSM850 bands and an amplifier 107 covering an around-2 GHz range of GSM1800 and 1900 bands; a receive RF-IC 109 comprising a low noise amplifier (LNA) 2, a quadrature demodulator (QUAD_MIX) 94, an oscillator 25, poly-phase filters (PPFs) 93 and 95, a DC offset calibrator (DCC) 96 and other elements; an analog-to-digital converter (ADC) 6 for receive signals; a digital signal processor (DSPCKT) 97 to perform decimation, down-conversion and channel filtering among other processing functions; a serial interface (Serial_I/F) 98 for signal outputting; a digital-to-analog converter (DAC) 99; a low pass filter 100, an output interface (Output MUX) 101, and a transmitter. The transmitter applies modulation to voltage controlled oscillators (VCOs) 61 and 17 by modulating signals with a Gaussian minimum shift keying modulator (GMSK_MOD) 11 via an interface (TX_I/F) 102 which receives binary numbers and entering the modulated signals into a fractional divider (FRC_DIV) 103 to have the dividing ratio varied.

Non-patent document 1: RF Micro Devices, Polaris™ Total Radio Solution, 2000.

SUMMARY OF THE INVENTION

In the above-described case of the prior art, two VCOs including the VCO 61 for the 1 GHz band and the VCO 17 for the 2 GHz band, are used for transmission and another VCO 25 is used for reception. Usually different VCOs have different control voltages and frequency characteristics. For this reason, it is necessary to optimize for each VCO the frequency characteristic of a loop filter (LF) 105 and the charge pump current amperage of a phase comparator (PD)/charge pump circuit (CP) 104.

Further, the output signal of the VCO 25 for reception is caused to pass the poly-phase filter 93 to be split into two local signals differing in phase by 90° from each other, which are applied to the quadrature demodulator 94. This system involves a problem of being subject to the influence of phase errors due to variations between elements constituting the poly-phase filter 93. Combined with inter-element variations of the poly-phase filter 95 for IF signals, provided at the output of the quadrature demodulator, this constitutes a deteriorating factor as an error component of receive signals.

Furthermore, since the outputs of the VCOs 61 and 17 for transmission use are directly applied to the inputs of the power amplifiers 106 and 107, modulating signals involving amplitude modulation, such as Enhanced Data rate for GSM Evolution (EDGE) for instance, cannot be transmitted.

An object of the present invention, therefore, is to provide a sigma delta (ΣΔ) transmitter capable of causing a loop filter, a charge pump current and so forth to operate under the same set conditions even in a plurality of frequency bands, being simplified in system, at the same time bringing the difference between the phases of local signals for reception use to exactly 90°, realizing a system that is robust against inter-element variations, and transmitting modulating signals involving amplitude modulation, such as EDGE, and a transceiver using it.

A ΣΔ transmitter according to the invention sets the oscillation frequencies of VCOs to even-number multiples of the transmit frequency, and generates transmit signals via dividers. In its configuration, a circuit which varies the gain according to the amplitude component of modulating signals is added to an amplifier whose input is signals from a VCO.

According to the invention it is possible to adapt in a simple configuration a ΣΔ transmitter realizing low power operation to multi-band use, and thereby to realize a transceiver that can transmit even modulating signals involving amplitude modulation, such as EDGE.

DETAILED DESCRIPTION OF THE PREFERRED EMBODIMENTS

A number of preferred embodiments of the present invention will be described in detail below with reference to accompanying drawings.

Embodiment 1

Figure 1:
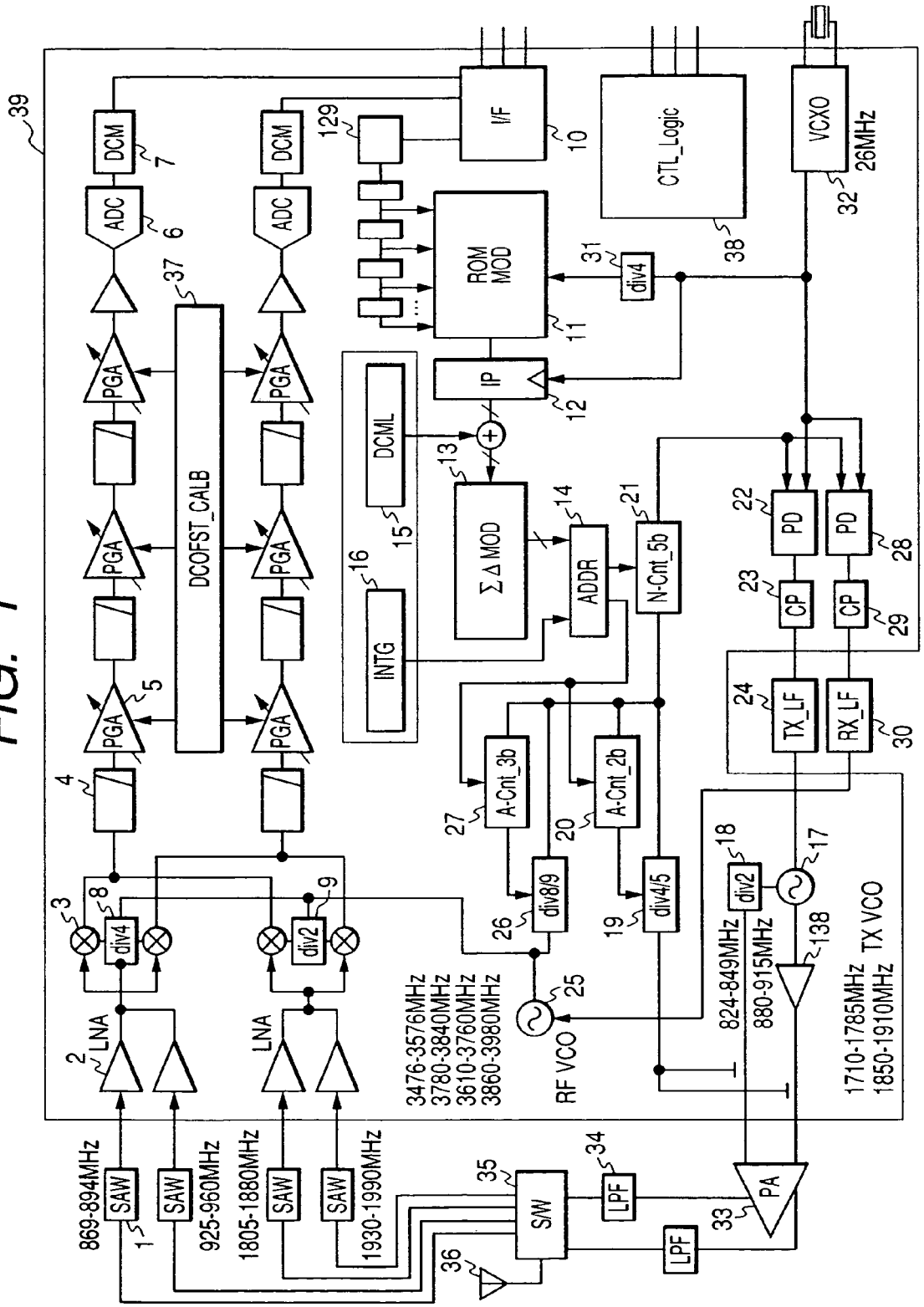
FIG. 1 shows the configuration of a ΣΔ transceiver, which is a first preferred embodiment of the present invention.

Embodiment 1 of the invention will be described below with reference to FIG. 1 and FIG. 2. FIG. 1 shows a transceiver using a transmitter according to the invention. This circuit is adaptable to four different frequency bands including GSM850, GSM900, DCS1800 and PCS1900. The transmission and reception bands of GSM850 here are 824 MHz to 849 MHz on the transmission side and 869 MHz to 894 MHz on the reception side. Those of GSM900 are 880 MHz to 915 MHz on the transmission side and 925 MHz to 960 MHz on the reception side. Those of DCS1800 are 1710 MHz to 1785 MHz on the transmission side and 1805 MHz to 1880 MHz on the reception side. Those of PCS1900 are 1850 MHz to 1910 MHz on the transmission side and 1930 MHz to 1990 MHz the reception side.

A receive signal is inputted via a surface acoustic wave (SAW) filter circuit 1 for removing interfering waves entering through an antenna 36 to a low noise amplifier (LNA) 2 on a high frequency integrated circuit 39. The signal amplified by the low noise amplifier undergoes frequency conversion by a mixer 3 into two baseband signals, I and Q. Each of the baseband signals I and Q passes a circuit array in which a plurality each of variable gain amplifiers (PGAs) 5 and interdigital transducers 4 for removing frequency-converted interfering waves are connected, and is converted into digital signals by an AD converter 6.

Where the gains of the variable gain amplifiers are great, the DC offsets of the mixer 3 and of the variable gain amplifiers 5 narrow the dynamic range of the AD converter. Therefore, calibration against the offsets is performed with a DC offset calibrating circuit (DCOFST_CALB) 37. Where an over-sampling type AD converter is used, the data quantity is reduced by decimation with a decimation filter (DCM) 7, and the reduced data are outputted to a digital signal processing IC of a later stage via an interface (I/F) 10.

The local signals inputted to the mixer 3 are generated by dividing the output signals of the VCO 25. By using a 4-divider (div4) 8 where the bands are GSM850 and GSM900 or a 2-divider (div2) 9 where they are DCS1800 and PCS1900, local signals for I and Q whose phase difference is exactly 90° are generated. The frequency of the VCO 25 is set by a ΣΔ type synthesizer circuit which is a constituent element of the transmitter and will be described afterwards.

For the reception purpose, an 8/9-variable divider (div8/9) 26, a 3-bit A-counter (A-Cnt__3b) 27 for controlling the dividing factor of the divider, and a 5-bit N-counter (N-Cnt__5b) 21 for counting the output of the divider are used. The output of the N-counter is phase-compared by a phase comparator 28 with the output signal of a quartz oscillator (VCXO) 32 for reference use, and a current whose pulse width is proportional to the phase difference is generated by a charge pump (CP) 29. The output current of the charge pump is smoothed by a loop filter (RX_LF) 30, and the smoothed current is applied to the frequency setting voltage input terminal of the VCO 25 and set to a prescribed frequency.

Figure 2:
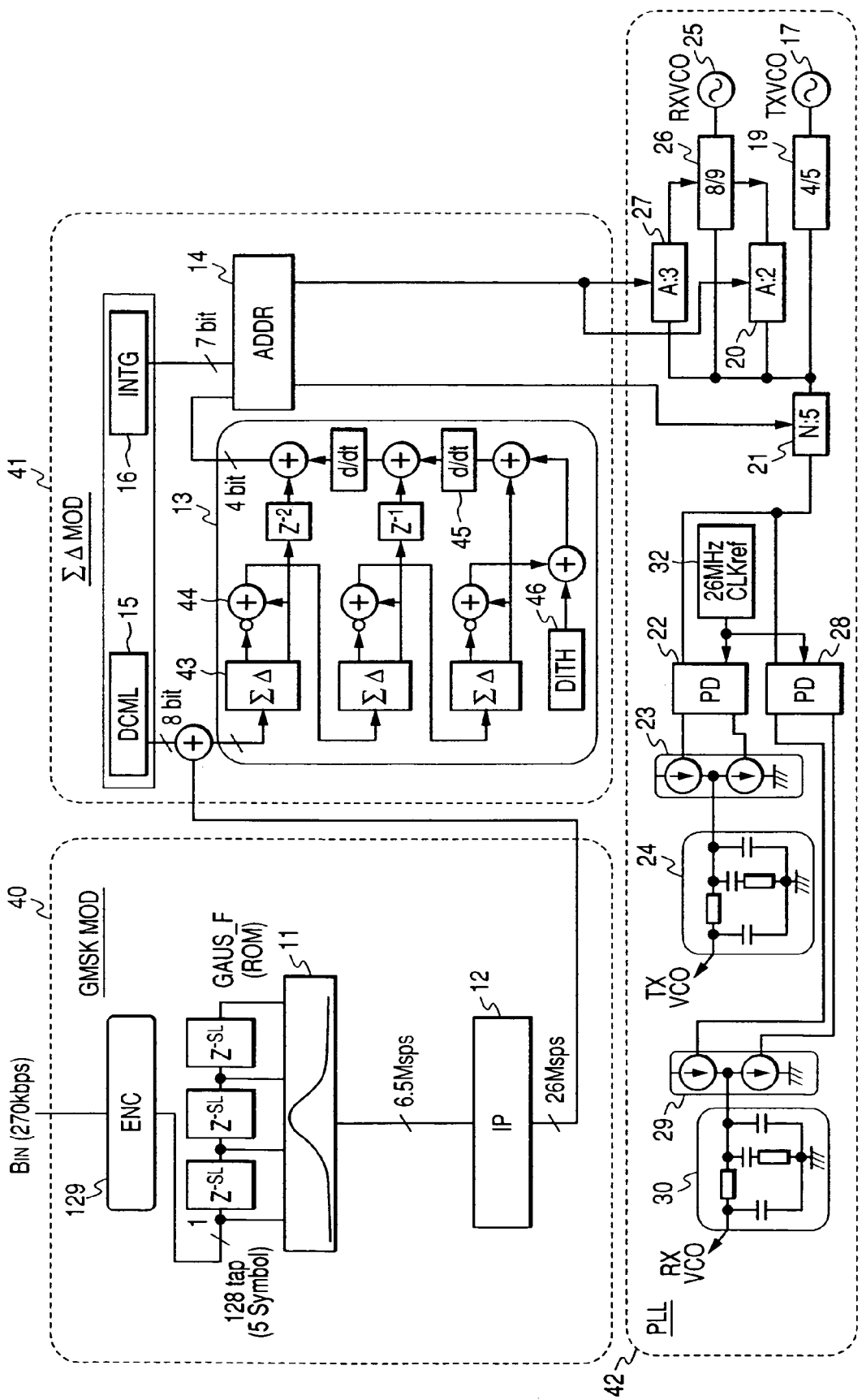
FIG. 2 shows details of the ΣΔ transceiver, which is the first preferred embodiment of the invention.

FIG. 2 shows details of the transmitter. An input signal BIN to the transmitter is a digital binary data signal of 270 kbps (tits/sec), which is converted by a digital modulator 40 into a value representing frequency information. First, the input binary signal $B_{IN}$ is converted by an encoder (ENC) 129 into a signal with a 2-bit code. The signal with the code undergoes band limitation by a Gaussian filter (GAUS_F) 11. The Gaussian filter may be either a finite impulse response (FIR) filter or a ROM having table data. Here, for instance 5 symbols (with intervals of 4 symbols) are composed of 128 taps. The output of the filter in this case is interpolated for 65 Msps (samples/sec) by an interpolator (IP) 12, converted into a data string of 26 Msps, which is the same sampling frequency as that of the output signal of the quartz oscillator 32 for reference use, and stored into a frequency setting register (INTG) 16.

Next, this stored data string is added to the output of a frequency setting register (DCML) 15, this output undergoing frequency setting at intervals of 200 kHz, which are the channel intervals of GSM. The result of addition is converted by a ΣΔ modulator (ΣΔMOD) 13 into a pseudo random progression whose frequency intervals are 26 MHz and added by an adder (ADDR) 14 to the output of the register 15 which sets the frequency at every 26 MHz, and the sums are set as counts of an A-counter 20 and an N-counter 21.

In the description of this embodiment, a third-order ΣΔ modulator 13 is supposed to be used as the ΣΔ modulator. In the third-order ΣΔ modulator, three first-order ΣΔ modulators 43 are used. The output of each modulator consists of the result of arithmetic operation and that of its quantization; the difference between the two results is calculated by an adder 44, and is made an input to the modulator of the next stage. The difference output of the third stage is added to the output of a pseudo random generator (DITH) 46 and, the result of adding this sum and the quantization output of the third stage is differentiated by a differentiator (d/dt) 45. The output of the differentiator is added to the quantization output of the delayed second stage modulator, and the sum is differentiated again. Repetition of this sequence results in conversion into a pseudo random progression having a sampling frequency of 26 MHz.

The 2-bit A-counter 20 and the 5-bit N-counter 21 within a PLL circuit 42 are set in 26 MHz cycles with the output of a ΣΔ modulator 41 as their counts. The A-counter, upon completion of the counting, switches over the 4-division and 5-division of a pre-scaler 19, and the N-counter, upon completion of the counting, outputs a pulse to a phase comparator (PD) 22.

The operation of the transmitter will again be described below with reference to FIG. 1. Phase comparison with the output signal of the quartz oscillator 32 for reference use takes place in the phase comparator 22, and a current having a pulse width proportional to the phase difference is generated by a charge pump (CP) 23.

The output current of the charge pump is smoothed by a loop filter (TX_LF) 24, applied to the frequency setting voltage input terminal of the VCO 17, and set to a value resulting from the superposition of the modulation signal frequency to a prescribed frequency. The output signals of the VCO 17, when signals in the DCS1800 and PCS1900 bands are to be transmitted, are applied as they are to the power amplifier module (PA) 33 via a buffer 138 and, after harmonics are removed by the low pass filter 34, and outputted from the antenna 36 via the switch 35. The output of the VCO 17 is also applied directly to the pre-scaler 19 for feedback use. When signals in the GSM850 and GSM900 bands are to be transmitted, the output of the VCO 17 is divided by a 1/2 divider 18, and the divided output is applied to the power amplifier module 33. The output of the 1/2 divider is also applied at the same time to a 4/5 divider 19 as a feedback signal. The power amplifier module here has, built into it, a power amplifier adaptable to GSM850 and GSM900 and another power amplifier adaptable to DCS1800 and PCS1900.

The frequencies of DCS1800 and PCS1900 are about double the transmit frequencies of GSM850 and GSM900. On the other hand, when signals of the GSM850 and GSM900 are to be outputted, a 1/2 divider is used. For this reason, with the divider being supposed as part of the VCO, the input control voltage-oscillation frequency coefficient Kv of the VCO, when operating in the GSM850 and GSM900 bands, is about half that of operation in the DCS1800 and PCS1900 bands.

Generally, the open loop gain GL of PLL is given by Equation (1) below by using the overall division ratio 1/M of the pre-scaler, A-counter and N-counter together, the input control voltage-oscillation frequency coefficient Kv of the VCO, the charge pump current Icp and the loop filter capacity CL.

$$GL=Kv*Icp/(CL*M) \quad (1)$$

To compare GSM850 and GSM900 on one hand and DCS1800 and PCS1900 on the other in terms of Kv/M, they are found substantially the same, and this means that the same charge pump and loop filter can be used in a plurality of frequency bands wide apart from each other in frequency level.

As described so far, by causing the VCO for local signal generation for reception use at a frequency twice or four times the frequency of receive signals and generating local signals by using dividers, local signals relatively free from phase errors and excelling in orthogonality can be generated. Furthermore, transmission in many frequency bands including GSM850, GSM900, DCS1800 and PCS1900 can be performed by using the same VCO 17, dividers (pre-scaler 19, A-counter 20 and N-counter 21), phase comparator 22, charge pump 23 and loop filter 24.

Embodiment 2

Figure 3:
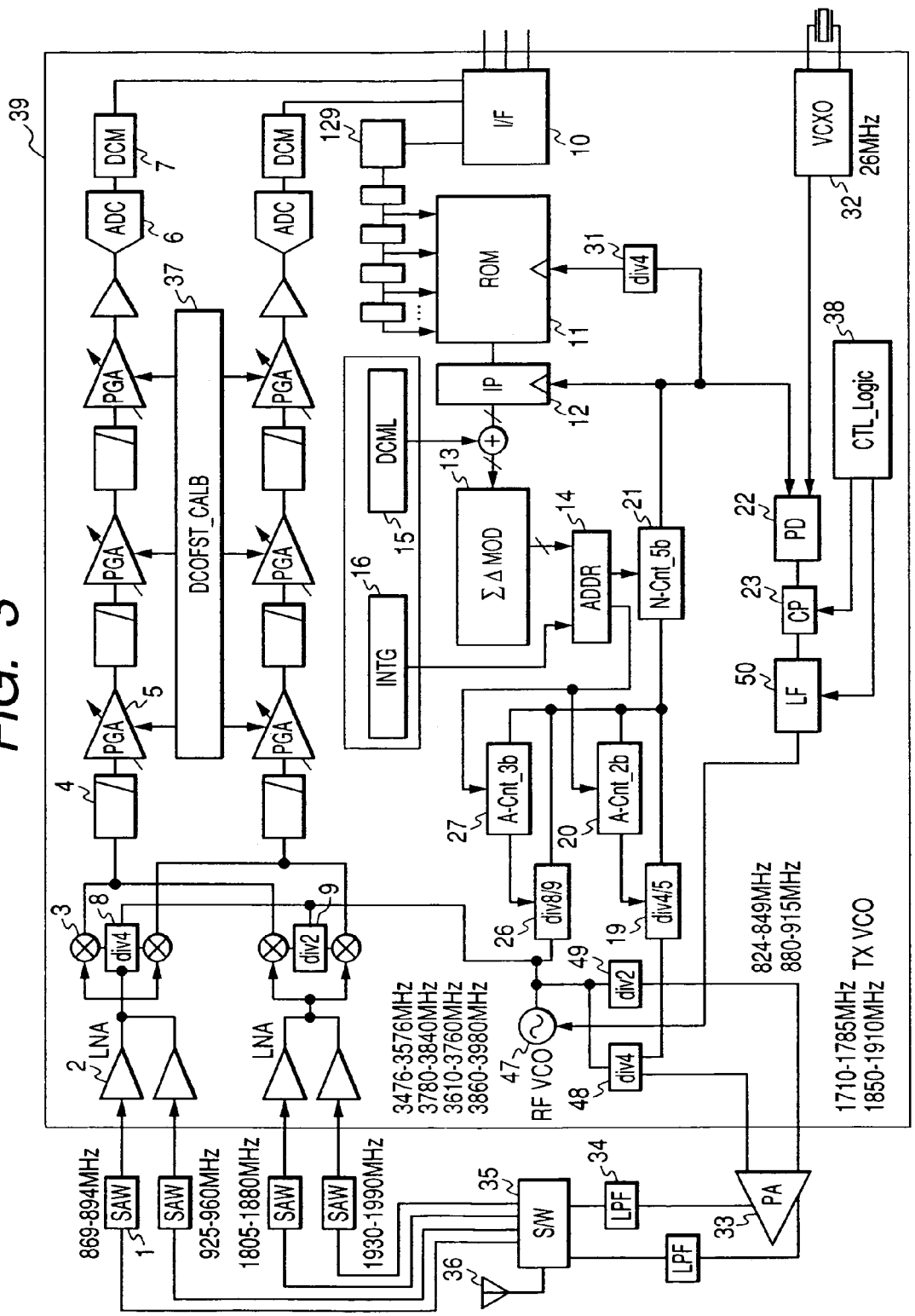
FIG. 3 shows the configuration of a transmitter with a loop gain calibrating function, which is a second preferred embodiment of the invention.

Embodiment 2 of the present invention will now be described with reference to FIG. 3. While Embodiment 1 uses two VCOs, one for transmission and the other for reception, a single VCO covers both transmission and reception in this embodiment. While the receiver and the system of generating local signals for reception use are the same as in Embodiment 1, the method of transmission signals here is slightly different. Incidentally, to avoid duplication, the same constituent parts as those shown in FIG. 1 to illustrate Embodiment 1 are denoted by respectively the same reference signs, and their detailed description will be dispensed with.

A VCO 47 oscillates at a frequency double the transmit frequency of DCS1800 and PCS1900; the oscillation signals from the VCO 47 id divided by a 1/2 divider 49 to generate transmit signals for DCS1800 and PCS1900. For GSM850 and GSM900, the frequency is divided by a factor of 4 by a 1/4-divider (div4) 48 to generate transmit signals. In addition to this feature, the hardware size can be reduced because a phase comparator, a charge pump and a loop filter (LF) 50 are used in common. The loop filter 50 is made compatible with different loop bands by changing over between a plurality each of capacitors and resistors (neither shown) by a switch controlled by a controller 38. Further, the loop gain is varied by varying the amperage of the charge pump. This embodiment makes some of the constituent elements of the transceiver available for common use, the size of the transceiver can be reduced.

Embodiment 3

Figure 4:
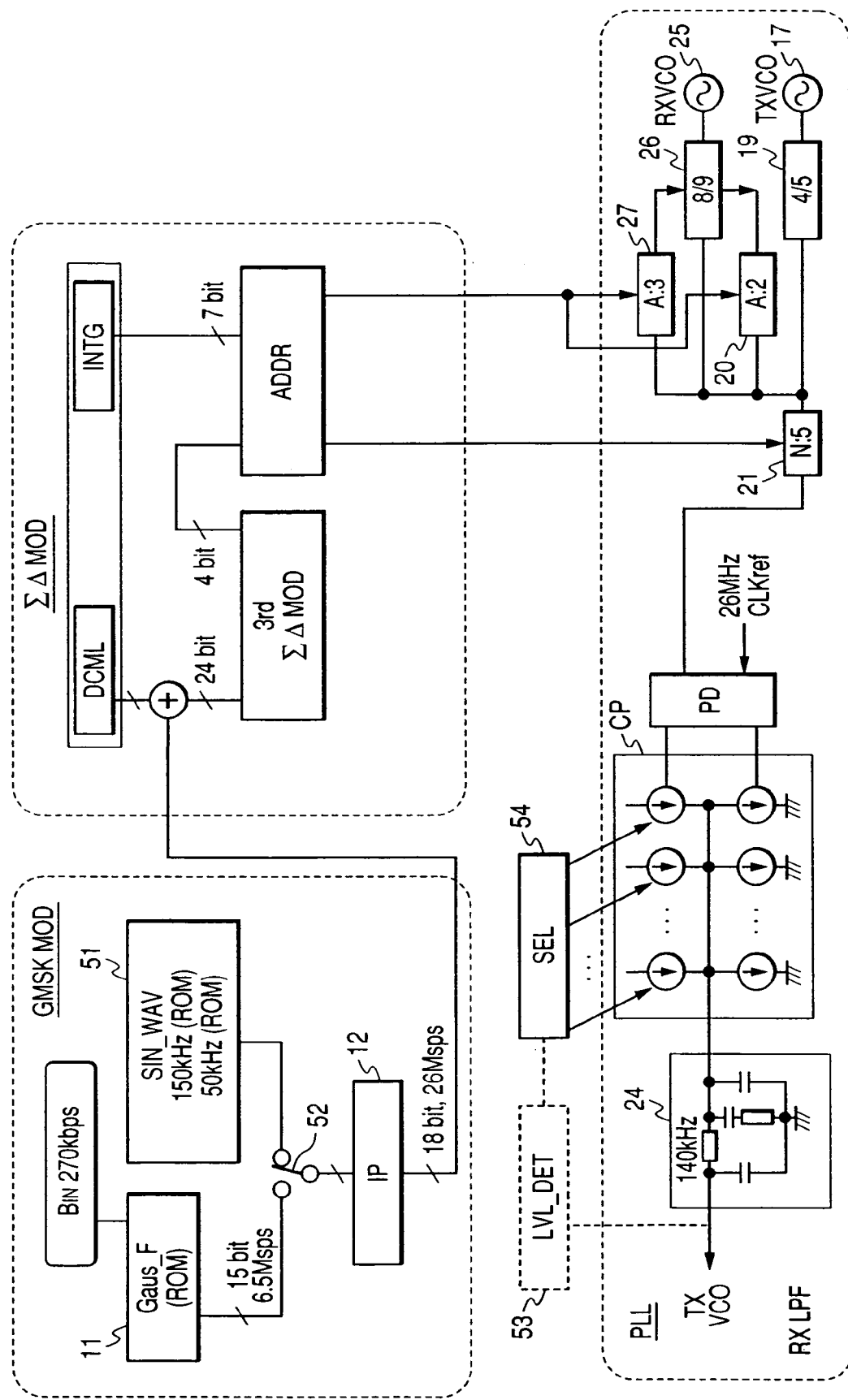
FIG. 4 shows the configuration of a transmitter adaptable to amplitude modulation signals, which is a third preferred embodiment of the invention.

Embodiment 3 of the present invention will be described below with reference to FIG. 4. In this embodiment, a function to calibrate the loop band is added to the transmitter. The loop band of PLL varies with the voltage-frequency characteristics of the VCO, charge pump current, fluctuations in capacitors constituting the loop filter, and variations in the dividing ratio of the divider corresponding to the frequency among other factors. This variation in loop band has adverse effects on the phase accuracy of modulating signals and extraband noise.

In a time division multiple access (TDMA) system, typically the GSM system, because transmission takes place intermittently, the loop band can be calibrated in advance of the transmitting operation. At the time of performing calibration, the output of the Gaussian filter (ROM) 11 is changed over with a switch 52 to a ROM 51 having sine data (SIN_WAV). In the ROM, sine data of a single frequency or a plurality of frequencies are stored.

The sine signals, like the transmit signals, are inputted to a ΣΔ demodulator via the interpolator 12 and converted into progressions divided by an A-counter and an N-counter. The oscillation signals from the VCO are divided by factors according to the setting of the A-counter and the N-counter; the result of division is compared with a reference signal CLKref, and a current proportional to the phase difference is generated by the charge pump CP. The output of the charge pump is smoothed by the loop filter 24 and fed back to the control voltage of the VCO. Then, as the control voltage of the VCO, a sine waveform having an amplitude matching the loop filter characteristic is regenerated. This amplitude of the sine wave is detected with an amplitude detector (LVL DET) 53. The closed loop characteristic Gc(s) can be readily obtained by combining Equation (1) above with the integration characteristic 1/s of the VCO and the transfer function F(s) of the loop filter as represented by Equation (2) below.

$$Gc(s)=Icp*F(s)/(1+F((s)*Kv*Icp/(M*s)) \quad (2)$$

This expresses a low pass filter characteristic. The frequency of the sine wave is set higher than the cut-off frequency of the filter, the amplitude of the voltage generated at the control terminal of the VCO is detected, the signal amplitude is compared with its designed level, the charge pump current is so adjusted by a selector (SEL) 54 as to correct that difference, and the loop band is thereby calibrated. The loop band can also be detected by storing the sine waveforms of two different frequencies, inside and outside the loop band, in a ROM 51 and comparing the responses of the two frequencies.

As described above, it is made possible to calibrate the loop band by using the sine wave data for calibration use, and accordingly to realize a transmitter relatively free from loop band variations due to fluctuations in element values and frequency setting conditions among other factors.

Embodiment 4

Figure 5:
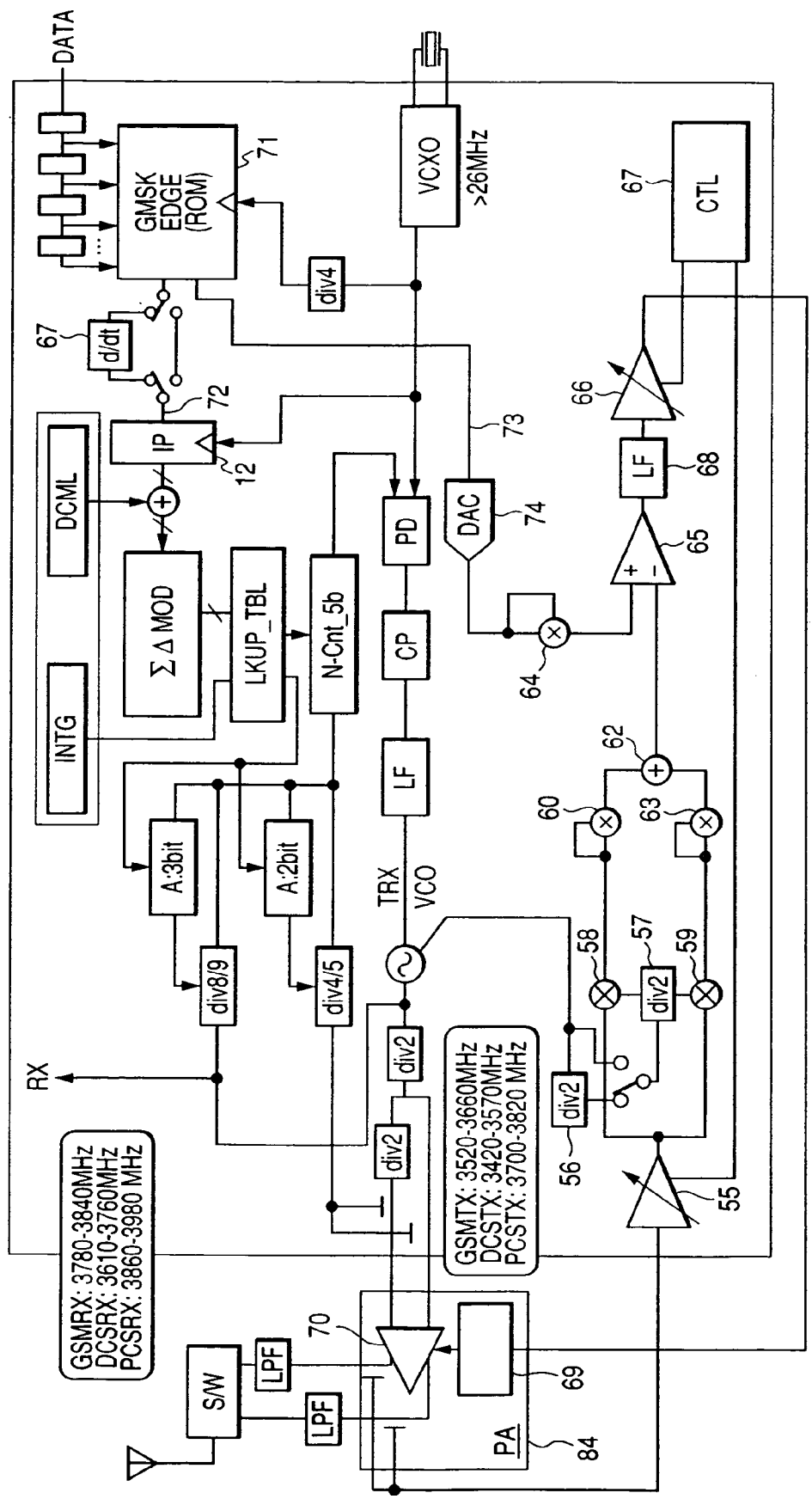
FIG. 5 further shows the configuration of a transmitter adaptable to amplitude modulation signals, which is a fourth preferred embodiment of the invention.
Figure 6:
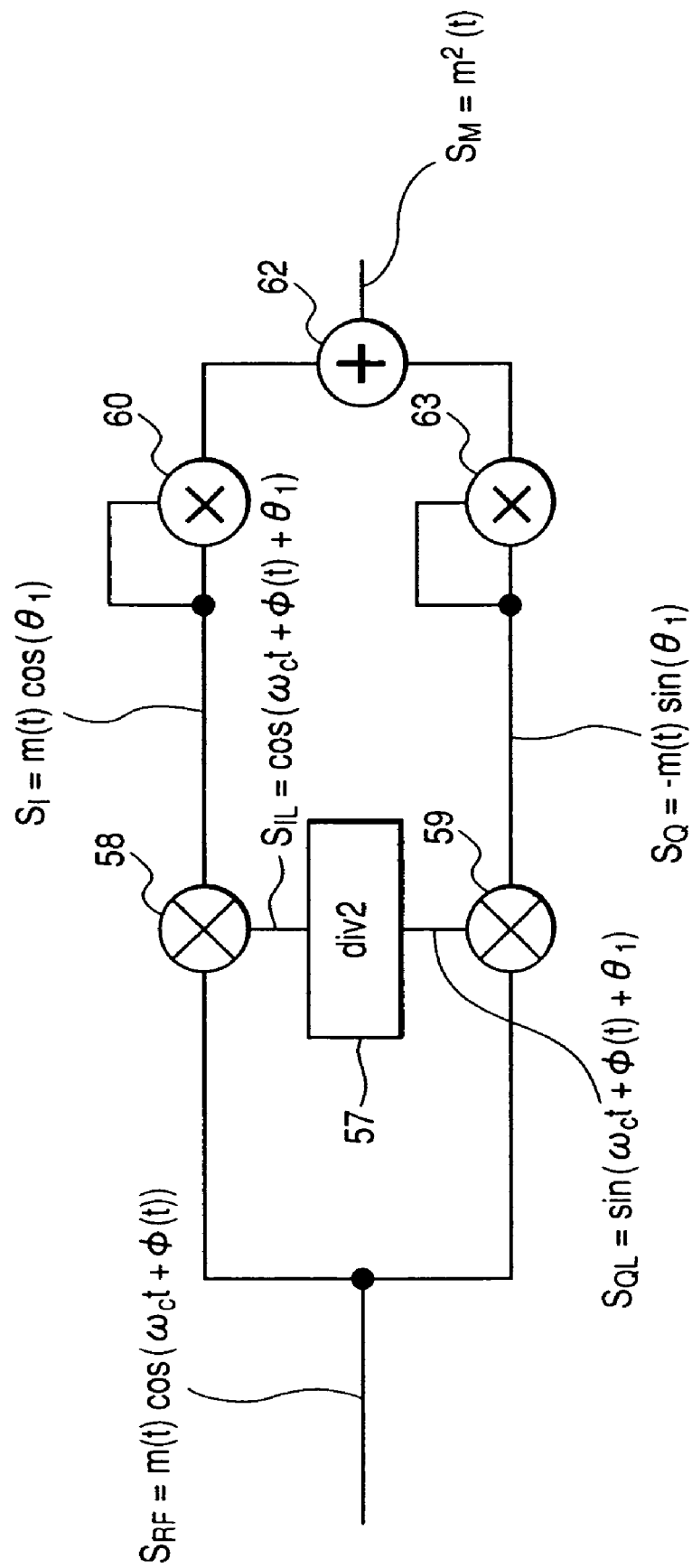
FIG. 6 shows an amplitude detector for use in a feedback circuit in the fourth preferred embodiment of the invention.

Embodiment 4 of the present invention will be described below with reference to FIG. 5 and FIG. 6. This embodiment is adaptable to modulating signals involving amplitude modulation, typically EDGE. In this embodiment, amplitude modulation information and gain information are supplied to a bias circuit 69 of a power amplifier 70, and desired modulation signals are generated as the output of the power amplifier. Usually the relationship between the bias and the output power is non-linear, and this non-linearity is cancelled by detecting the difference from the reference signal with a feedback circuit and returning the integral of that difference. In this embodiment, the power amplifier functions as a variable gain amplifier and an amplitude modulator. As this eliminates the need to use a high frequency variable gain amplifier, which is apt to generate noise, it is made possible to dispense with an expensive inter-digital transducer for noise reduction. Further, when the output power is to be reduced, the bias of the amplifier is lowered, making it possible to reduce the average power efficiency.

Details of this embodiment will be described below. Both data for GMSK and data for EDGE are stored in a ROM 71, which is driven with a binary signal input, and selectively used according to the type of operation. When in EDGE operation, signals are split into phase information and amplitude information 73. The phase information, after being converted by a differentiator 137 into frequency information, is inputted to the ΣΔ modulator via the interpolator 12 as in Embodiments 1 and 2, and modulates the VCO with the phase information. The amplitude information is converted by a DA converter 74 into analog signals. A squaring circuit 64 is provided at the output of the DA converter to square the amplitude, and the resultant square value is used as the reference signal for an amplitude feedback circuit to be described afterwards.

A power amplifier module (PA) 84 comprises the power amplifier 70 and the bias circuit 69. Signals from the VCO, modulated with phase signals, are inputted to the high frequency input terminal of the power amplifier 70 via a divider. Herein, as feedback is applied to the output end of the divider, the divider output emerges as a correctly modulated wave. The output of the power amplifier is made constant by amplifying or attenuating it with a variable gain amplifier 55, and converted into baseband signals by mixers 58 and 59. The local signals from the mixers are generated by dividing the output signals of the VCO, modulated with the phase signals of transmit signals. One 2-divider 57 is used for the DCS1800 and PCS1900 bands, and another 2-divider 56 is added for the GSM900 and GSM850 bands to obtain the desired signals by dividing the frequency by four.

The output signal of the power amplifier is supposed to be represented by Equation (3) below.

$$S_{RF}=m(t)\cos(w_c t+\phi(t)) \quad (3)$$

Herein, m(t) is an amplitude signal, $w_c$, a carrier frequency (angular frequency) and $\phi(t)$, a phase modulating signal.

On the other hand, the two local signals generated by the divider are represented by Equations (4) and (5) below.

$$S_{IL}=\cos(w_c t+\phi(t)+\theta_1) \quad (4)$$

$$S_{QL}=\sin(w_c t+\phi(t)+\theta_1) \quad (5)$$

Here, $\theta_1$ is a phase difference attributable to a delay difference between the local signal generators (from the VCO to the local signal input terminals of the mixers 58 and 59) and the signal path (from the input unit of the power amplifier 70 to the RF input terminals of the mixers 58 and 59), and may be either plus or minus in value. The baseband signals generated by multiplying these signals are represented by Equations (6) and (7) below.

$$SI=m(t)\cos(\theta_1) \quad (6)$$

$$SQ=m(t)\cos(\theta_1) \quad (7)$$

These baseband signals are added by an adder 62 via squaring circuits 60 and 63. The final results of this process are the squares of the amplitude signals. They are compared by a comparator 65 with the output of the squaring circuit 64, and the result is integrated by a loop filter 68. A potential generating in the loop filter is amplified by an amplifier 66 to drive the bias circuit 69.

The gain of the amplifier 55 is so set as to keep its output constant even if the output of the power amplifier 70 varies as stated above. Since the amplifier 55 is within the loop, if its gain is varied, the closed loop characteristic may vary to make it impossible to keep its stability. In order to solve this problem, the stability of the loop is maintained irrespective of the output power of the amplifier by complementarily varying the gain of the variable gain amplifier 66 with a controller (CTL) 67 and thereby keeping the open loop gain constant.

This embodiment makes it possible to realize a transmitter adaptable to both low amplitude modulation signals and amplitude modulation signals.

Embodiment 5

Figure 9:
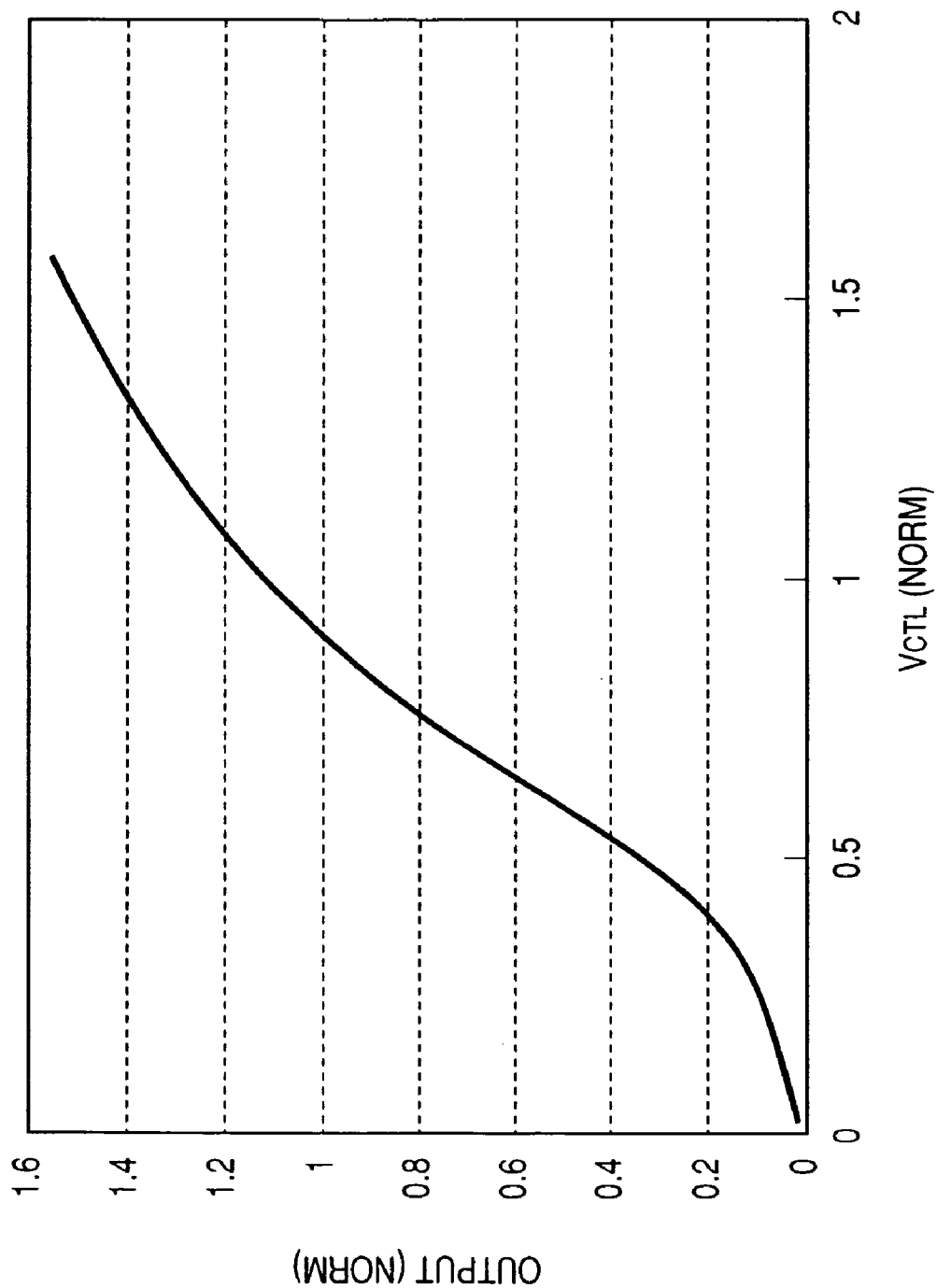
FIG. 9 shows the input/output amplitude characteristics of a power amplifier for use in the fifth preferred embodiment of the invention.
Figure 10:
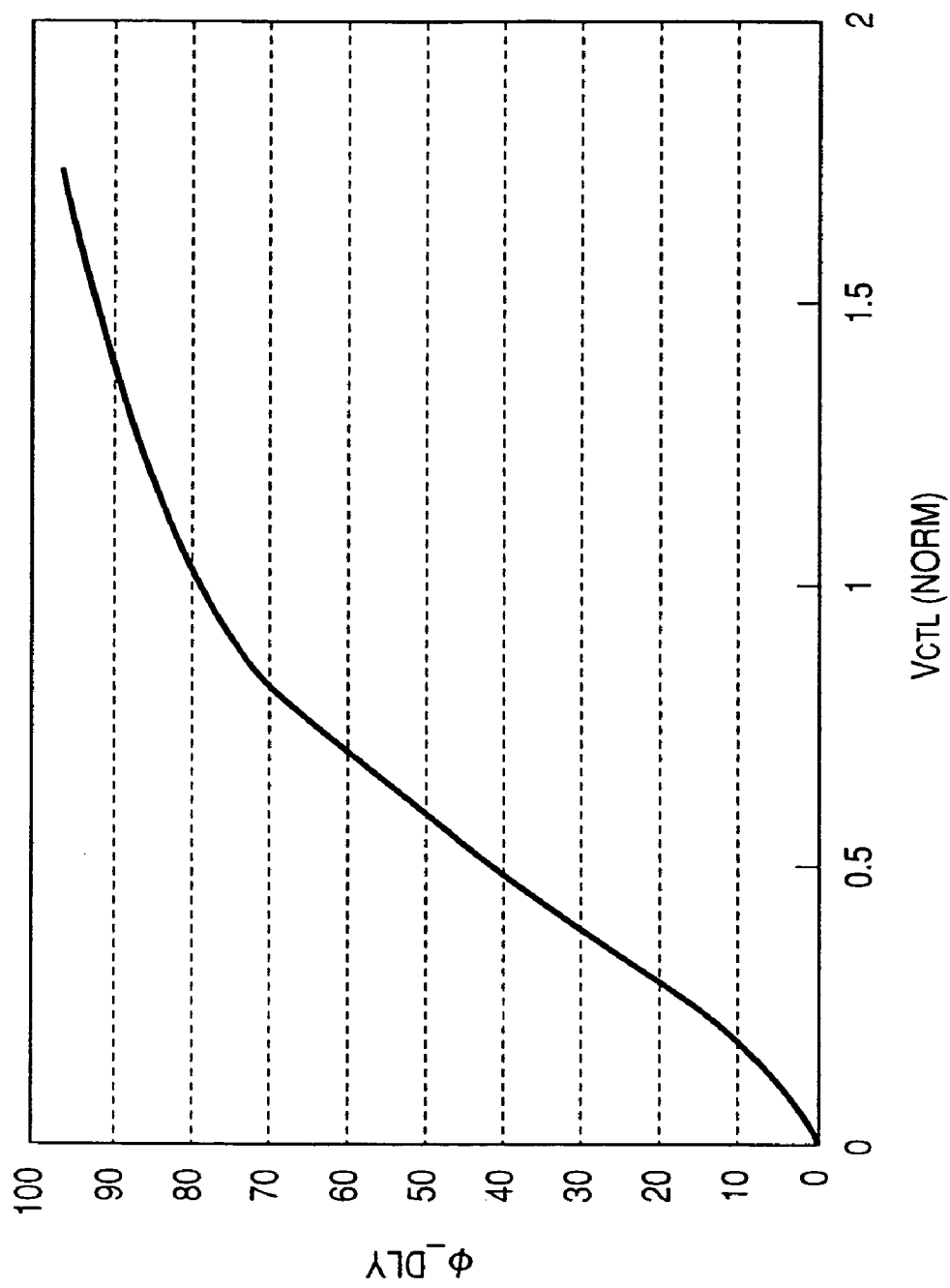
FIG. 10 further shows the input/output amplitude characteristics of the power amplifier for use in the fifth preferred embodiment of the invention.

Embodiment 5 of the present invention will be described below with reference to FIG. 7 through FIG. 13. In Embodiment 3, phase information after phase modulation has gone through the VCO is kept intact before it is amplified by a power amplifier, but some power amplifiers are subject to occurrence of a phase variation along with a gain variation, which could deteriorate modulating signals. This embodiment is intended to make possible generation of transmit modulating signals which will not be deteriorated even if a gain variation gives rise to a phase variation. FIG. 9 and FIG. 10 show examples of characteristics of a non-linearly operating saturated power amplifier when its output power is regulated by controlling its bias.

FIG. 9 shows the output power characteristic (OUTPUT) versus the voltage input ($V_{CTL}$) for gain control, both normalized. Here, the value at the maximum output is supposed to be 1. Although the inclination is monotonous positively, it is distorted and therefore requires linearity by negative feedback. FIG. 10 shows the output power delay characteristic ($\phi\_DLY$) versus the voltage input $V_{CTL}$ for gain control. It is seen that the input/output phase difference varies depending on the control voltage, and that the phase of a saturated amplifier, for instance, is affected by a gain variation.

Both the phase and the amplitude of a transmitter involving this power amplifier is improved in linearity by applying negative feedback to the phase and amplitude signals.

Figure 8:
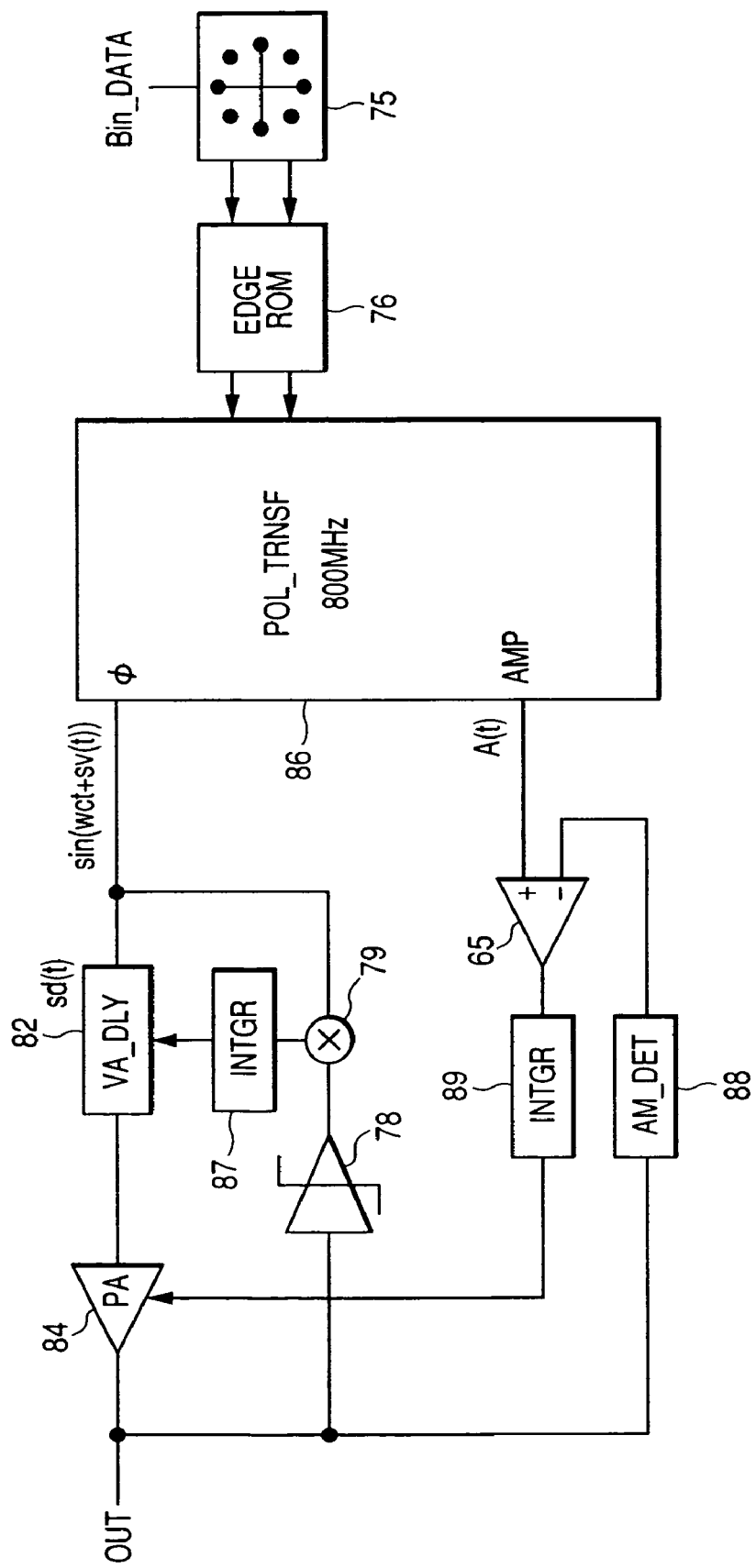
FIG. 8 is a circuit diagram illustrating the principle of the fifth preferred embodiment of the invention.

FIG. 8 is a block diagram of an EDGE-adaptive transmitter involving feedback of these two lines. Input signals expressed in binary numbers (Bin_DATA) are converted by a code converter 75 into eight kinds of codes including:

(0, 1), (0.5, 0.5), (1, 0), (0.0, −0.5),
(0, −1), (−0.5, −0.5), (−1, 0), (−0.0, 0.5)

I signals which are x coordinate signals and Q signals which are y coordinate signals are subjected to band limiting by filters. More specifically, a data string in a read only memory (ROM) 76 recording impulse responses is multiplied by the above-stated codes to constitute the filters. The T signals and the Q signals undergo a conversion represented by Equation (8) by a frequency conversion and polar coordinate transfer device (POL_TRANSF) 86.

$$A(t)\text{SIN}(\omega_c t+sv(t))=I(t)\text{COS}(\omega_c t)+Q(t)\text{SIN}(\omega_c t) \quad (8)$$

Here, $\omega_c t$ is the carrier frequency; $A(t)$, the amplitude signal; and $sv(t)$, the phase signal. $I(t)$ and $Q(t)$ are supposed to be analog signals resulting from the conversion of, after the I and Q signals are subjected to band limiting, digital data strings. $A(t)$ and $sv(t)$ are separately outputted from the frequency conversion and polar coordinate transfer device 86.

The output of the power amplifier (PA) 84 undergoes detection of its amplitude component (envelope) by an amplitude detector (AM_DET) 88. The difference between the output of the detector and the earlier amplitude signal $A(t)$ is detected by the comparator 65 and integrated by an integrator (INTGR) 89, and the bias voltage of the power amplifier is controlled with the output of the integrator. This enables an output having the same envelope waveform as $A(t)$ to be obtained from the power amplifier 84.

Although this envelope control can suppress the influence of the non-linearity of the voltage input for gain control and the output power shown in FIG. 9 on the amplitude component (envelope), at the same time the non-linearity of the voltage for gain control and the delay shown in FIG. 10 affects the phase signal. To eliminate this adverse effect, the output phase of the power amplifier is detected and the phase error is suppressed by using a variable delay circuit (VA DLY) in this embodiment.

The output signal of the power amplifier is converted by a limiter-amplifier 78 into a signal $\text{SIN}(\omega_c t+svout(t))$ which is constant in amplitude and has only a phase signal. Here, $svout(t)$ is the phase information of the power amplifier output. By having a multiplier 79 multiply this by $\text{COS}(\omega_c t+sv(t))$ to remove the wide band component, $0.5\text{SIN}(sv(t)−svout(t))$ is obtained. By having this integrated by an integrator 87 and feeding it back to a variable delay circuit 82, the error due to the non-linearly of the voltage for gain control and the delay of the power amplifier 84 can be suppressed.

Figure 7:
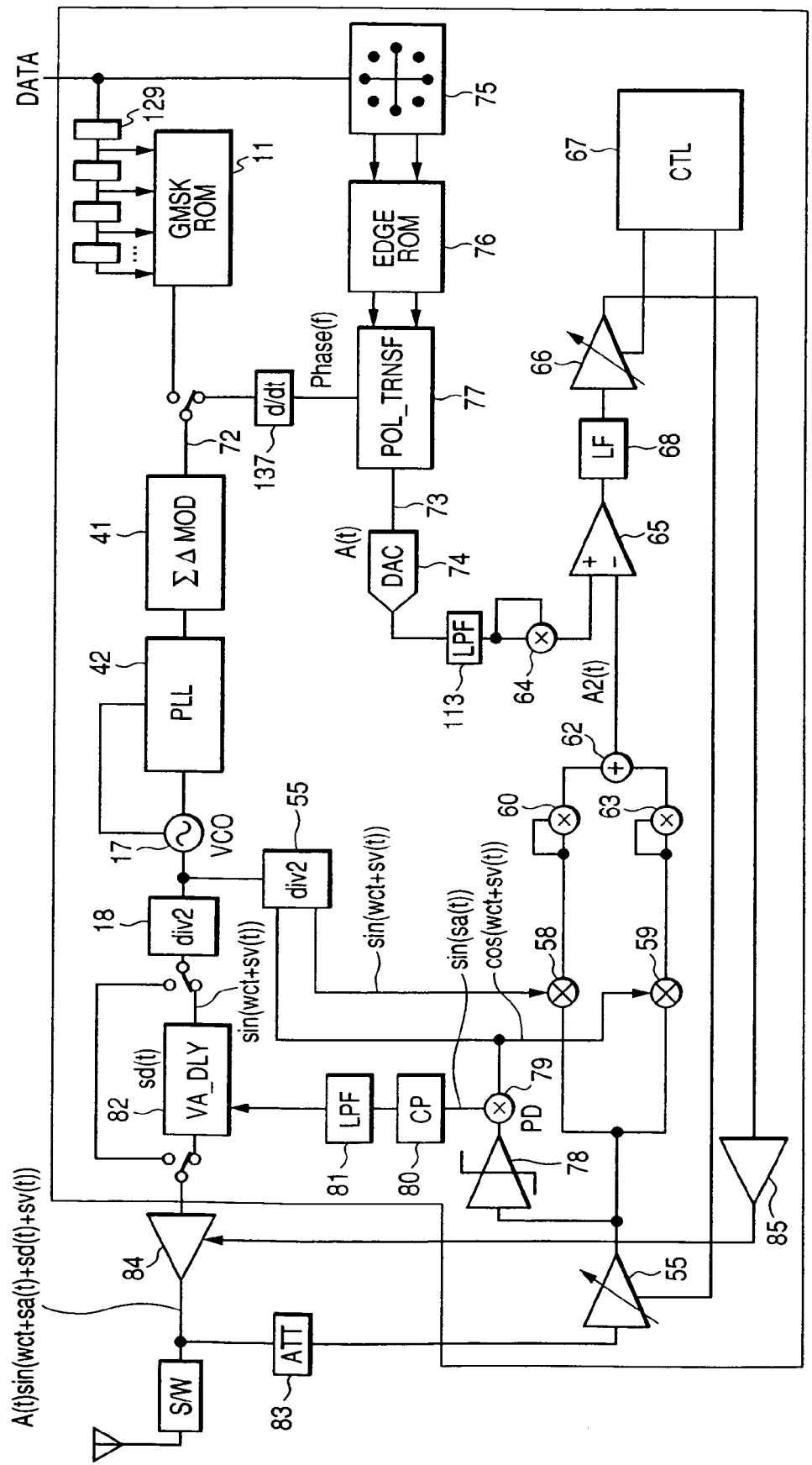
FIG. 7 shows a transmitter adaptable to amplitude modulation signals, which is a fifth preferred embodiment of the invention.

A specific circuit configuration of this embodiment is shown in FIG. 7. FIG. 7 shows a transmitter adaptable to both GMSK and EDGE. For the sake of brevity, the following description will focus on its operation in the GSM bands (GSM850 and GSM900).

Where it handles EDGE signals, the transmitter converts input binary signals into I and Q signals by using an encoder 75 and a filter (ROM) 76. The I and Q signals are converted by a polar coordinate transfer device 77 into a phase signal $(sv(t))$ and an amplitude signal 73 $(A(t))$. The phase signal, after being converted by the differentiator 137 into frequency information 72, and modulated with a pseudo random number by the ΣΔ modulator 41; by varying the dividing ratio of the PLL circuit 42, a phase signal of a desired frequency is generated via the VCO 17 and the divider 18. This signal is given by $\sin(\omega_c t+sv(t))$. Further the phase signal, after being given a delay element $sd(t)$ via the variable delay circuit 82, is applied to the power amplifier module 84. In the power amplifier module, a delay element $sa(t)$ which varies along with bias control is further added, and further undergoing amplitude modulation by bias control results in a final output of $A(t)\sin(\omega_c t+sa(t)+sd(t)+sv(t))$.

The amplitude signal 73 is converted into an analog signal by a DA converter 74. The output of the DA converter, after being cleared of high frequency components by a filter (LPF) 113, is entered into the squaring circuit 64. Regarding the output of the squaring circuit 64, as in Embodiment 4, the output of the power amplifier module 84 is attenuated by an attenuator (ATT) 83, and its difference from a signal resulting from the squaring of the output signal amplitude obtained via the variable gain amplifier 55, mixers 58 and 59, squaring circuits 60 and 63 and adder 62 is detected by the comparator 65. The different signal, after being integrated by the loop filter (LF) 68, is applied to a bias circuit 85 via the variable gain amplifier 66 to subject the bias power supply terminal of the power amplifier module 84 to amplitude modulation. The local signals of the mixers, as in Embodiment 4, are generated by dividing the output of the VCO 17.

As described with reference to FIG. 8, the influence of $sa(t)$ on the phase signal is removed by applying feedback to the variable delay circuit 82. The influence of the amplitude signal $A(t)$ is removed by the limiter 78, the multiplier 79 is caused to function as a phase comparator, errors were detected, a current corresponding to the error is generated by a charge pump (CP) 80, the error current is integrated by a low pass filter 81, and feedback is applied to the variable delay circuit 82.

When GMSK signals are to be handled, the inputted binary signal string is converted into a synthesized impulse response string having undergone band limiting by the Gaussian filter 11. When a GMSK modulated wave is to be transmitted, this impulse string is applied to the ΣΔ modulator (ΣΔMOD) 41, the dividing ratio of the PLL circuit 42 is varied with a pseudo random number, transmit signals are generated via the VCO 17 and the divider 18, and the signals are amplified by the power amplifier module 84. In this case, either the delay quantity of the variable delay circuit 82 is fixed or the circuit is bypassed.

Figure 11:
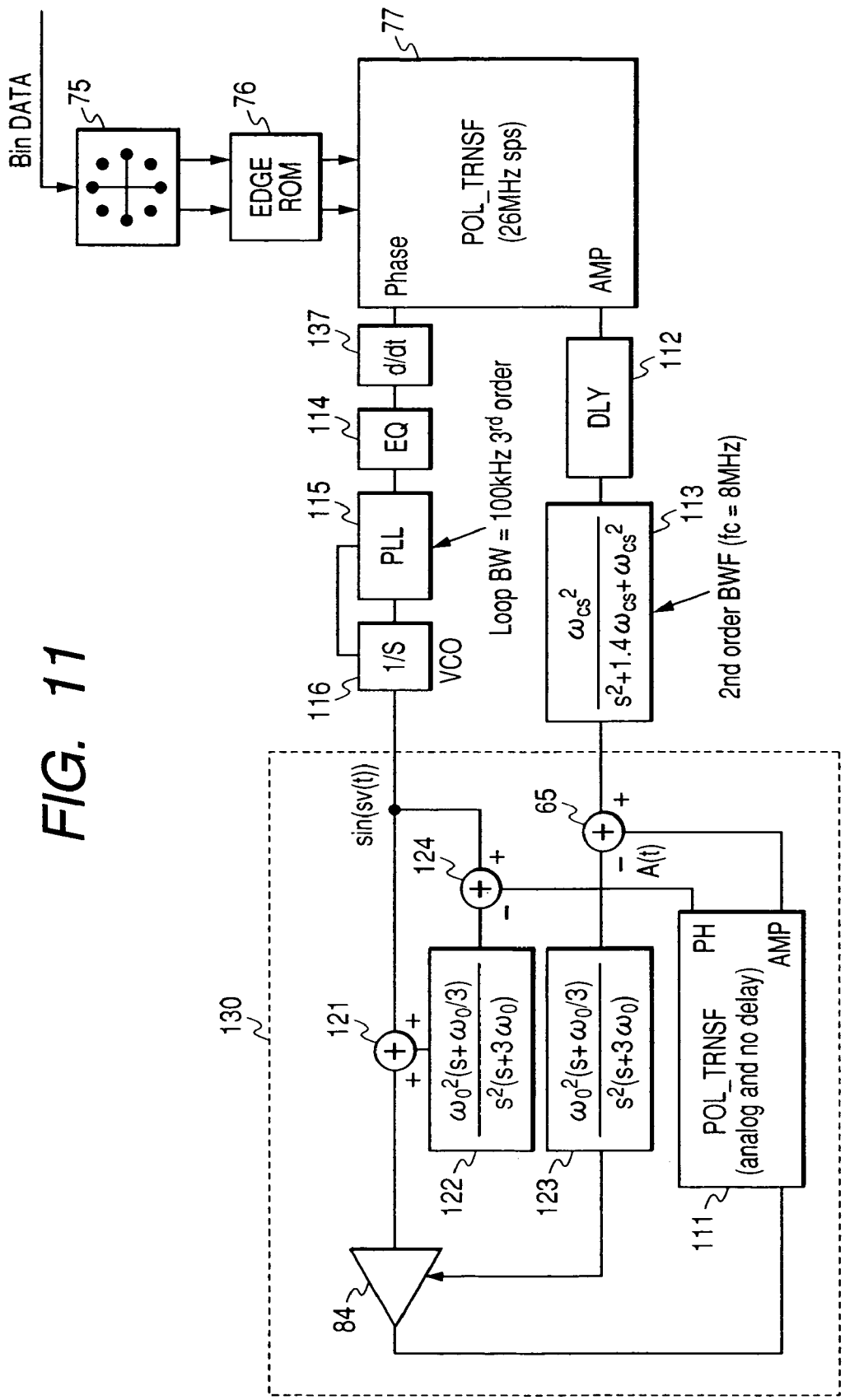
FIG. 11 shows a circuit for operation verification in the fifth preferred embodiment of the invention.

In order to confirm the EDGE-adaptive operation of this embodiment and its validity, simulation was performed by using a circuit shown in FIG. 11. The encoder 75, the EDGE ROM 76 storing an EDGE-standard filter and the polar coordinate transfer device 77 have respectively the same configurations as their counterparts in FIG. 7. The sampling frequency of the polar coordinate transfer device 77 is 25 MHz. Whereas the phase signal is converted by the ΣΔ transmitter into a high frequency, modeling was attempted here by applying linear equivalent circuits of a PLL circuit 115 and a VCO (integrating element) 116. Although the closed loop band of the PLL circuit including the VCO was supposed to be 100 kHz, as the conversion of an EDGE signal into polar coordinates expands the frequency band of the phase signal, the high range of the passing signal is attenuated in a band of 100 kHz. To address this problem, an equalizer (EQ) 114 which increases its gain in a high range was added to supplement the shortage. The amplitude signal was matched in timing by a delay circuit (DLY) 112 with the delay of the phase signal in the equalizer 114 and the PLL 115.

In order to clear the amplitude signal of its high range noise, a second-order Butterworth filter (BWF) 113 of the 8 MHz band was added. Regarding the input/output amplitudes and phase characteristics of the power amplifier module 84, the characteristics illustrated in FIG. 9 and FIG. 10 were applied for the phase characteristics. The output signal was converted into amplitude and phase signals by a polar coordinate converter 111, their respective errors were detected by the comparators 65 and 124, respectively, integrated by integrator-involving loop filters 122 and 123, and subjected to feedback. Here, the unit gain frequency f0 (=2πw0) of the loop filter was set to 4 MHz. Regarding phase information, errors were integrated, and the resultant integral was added to the original signal by an adder 121.

Figure 12:
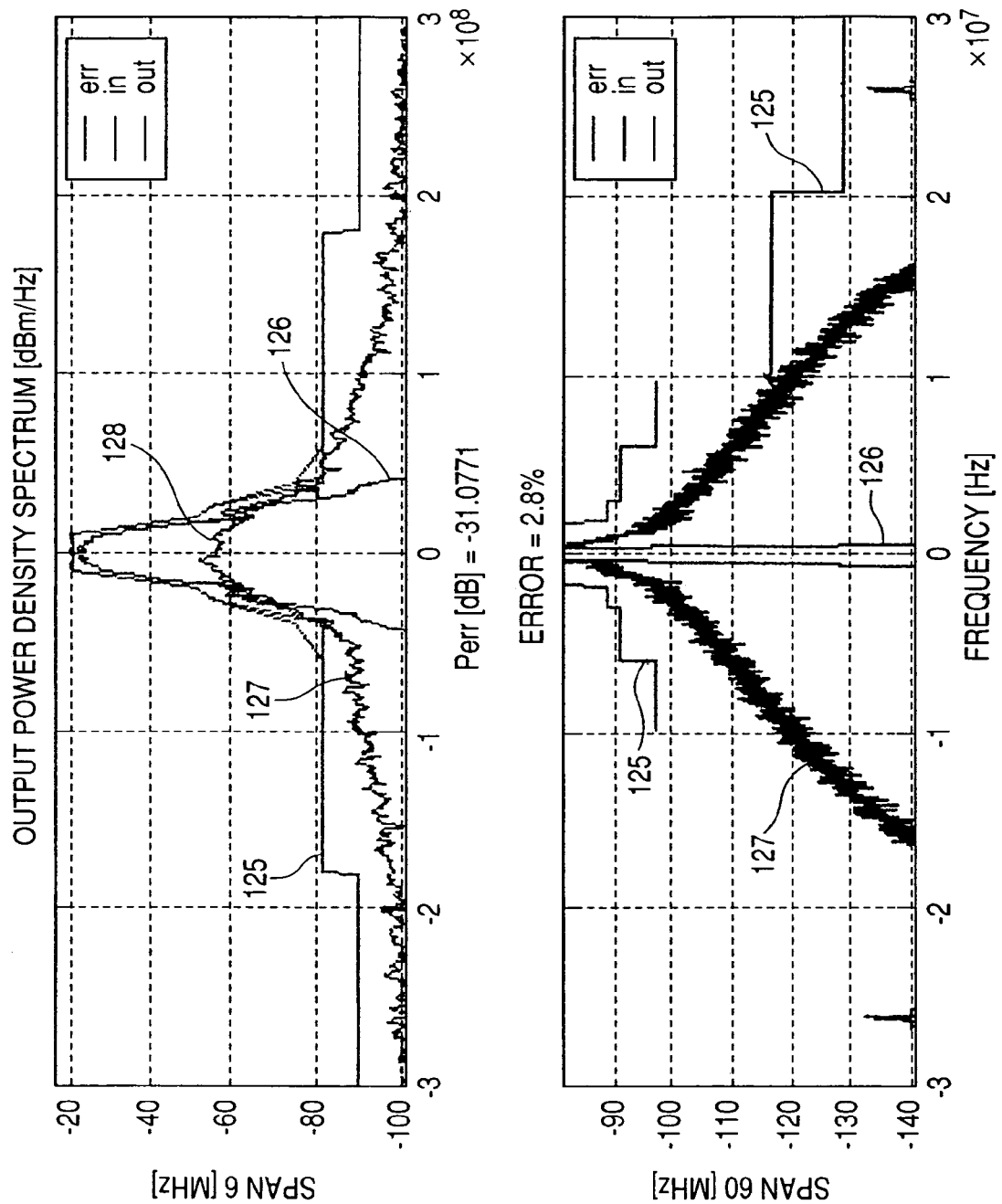
FIG. 12 shows the result of simulation of the circuit of FIG. 11 (the gain of the loop filter is set to a value deviating by −5% from the designed center)
Figure 13:
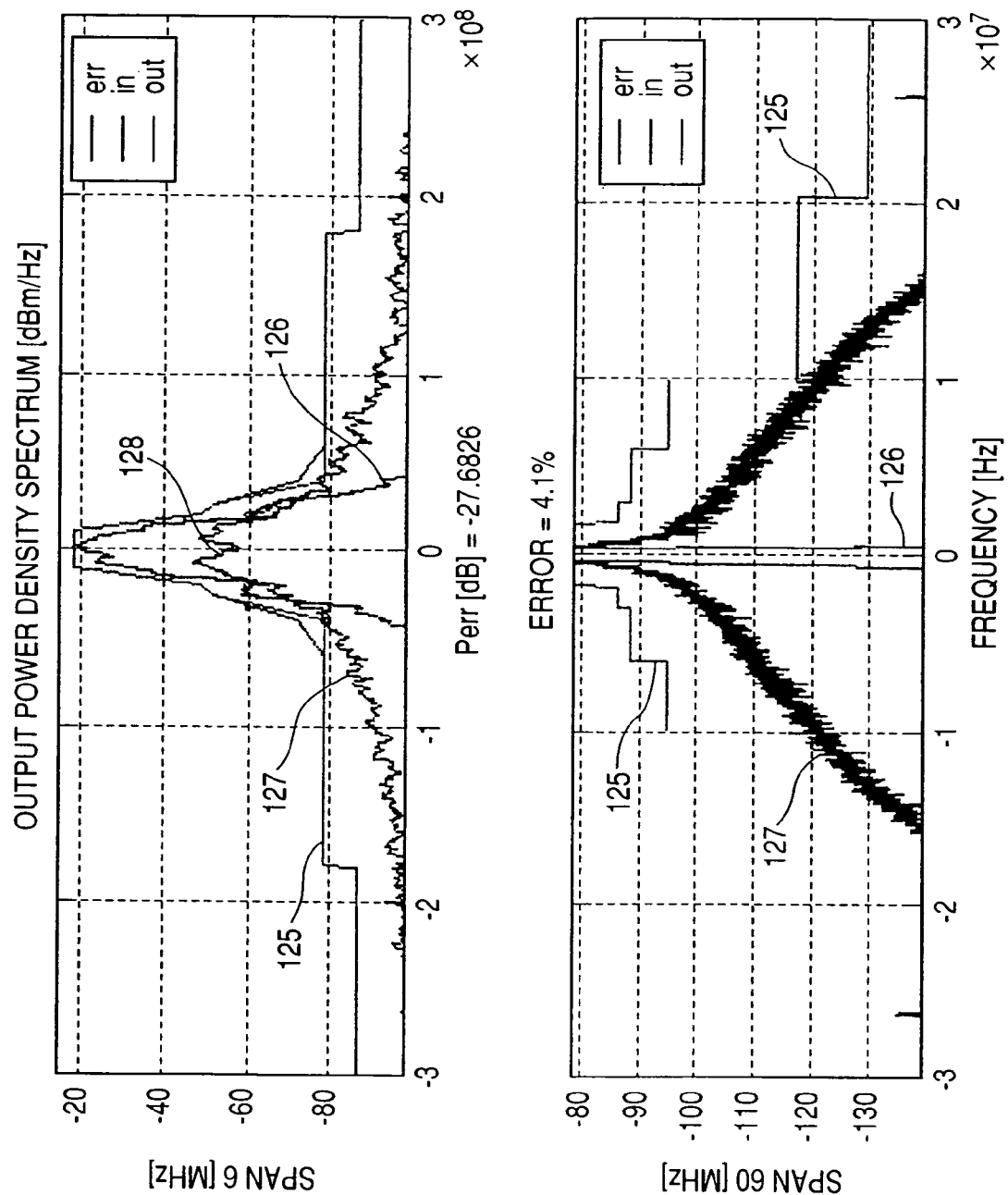
FIG. 13 shows the result of simulation of the circuit of FIG. 11 (the gain of the loop filter is set to a value deviating by +5% from the designed center)

FIG. 12 and FIG. 13 show the result of computed simulation of this circuit when the loop band of the PLL, whose characteristics are particularly affected by variations in element values of analog circuits, was varied by +5% and −5%, respectively. In each drawing which consists of two graphs, upper and lower, the upper one is the spectrum of the ±3 MHz band, and the lower one, of the ±30 MHz band. Each graph shows an input signal 126 of a feedback system 130, an output signal 127 of the power amplifier module, both defined by the output terminal of the VCO and the output terminal of the low pass filter for amplitude signals, the difference 128 between these two signals, and the standard level 1.25 of the EDGE modulating signal. From the results shown in FIG. 12 and FIG. 13, it was confirmed that a satisfactory output signal could be obtained even if the loop band of the PLL varied. The modulation errors in the two cases were 2.8% and 4.1%, small enough to pose no practical problem. As shown in the lower graphs of FIG. 12 and FIG. 13, spurious responses appeared in input signals at a frequency 26 MHz away when there was any variation in the loop band, but it is seen that they can be sufficiently suppressed by the band limiting effect of the feedback system 130.

The foregoing description reveals that this embodiment is adaptable to both GMSK signals whose amplitude does not vary and EDGE signals whose amplitude does vary, and can suppress the adverse effect of the non-linearity of the power amplifier which poses a problem when it is subjected to amplitude modulation.

Embodiment 6

Figure 14:
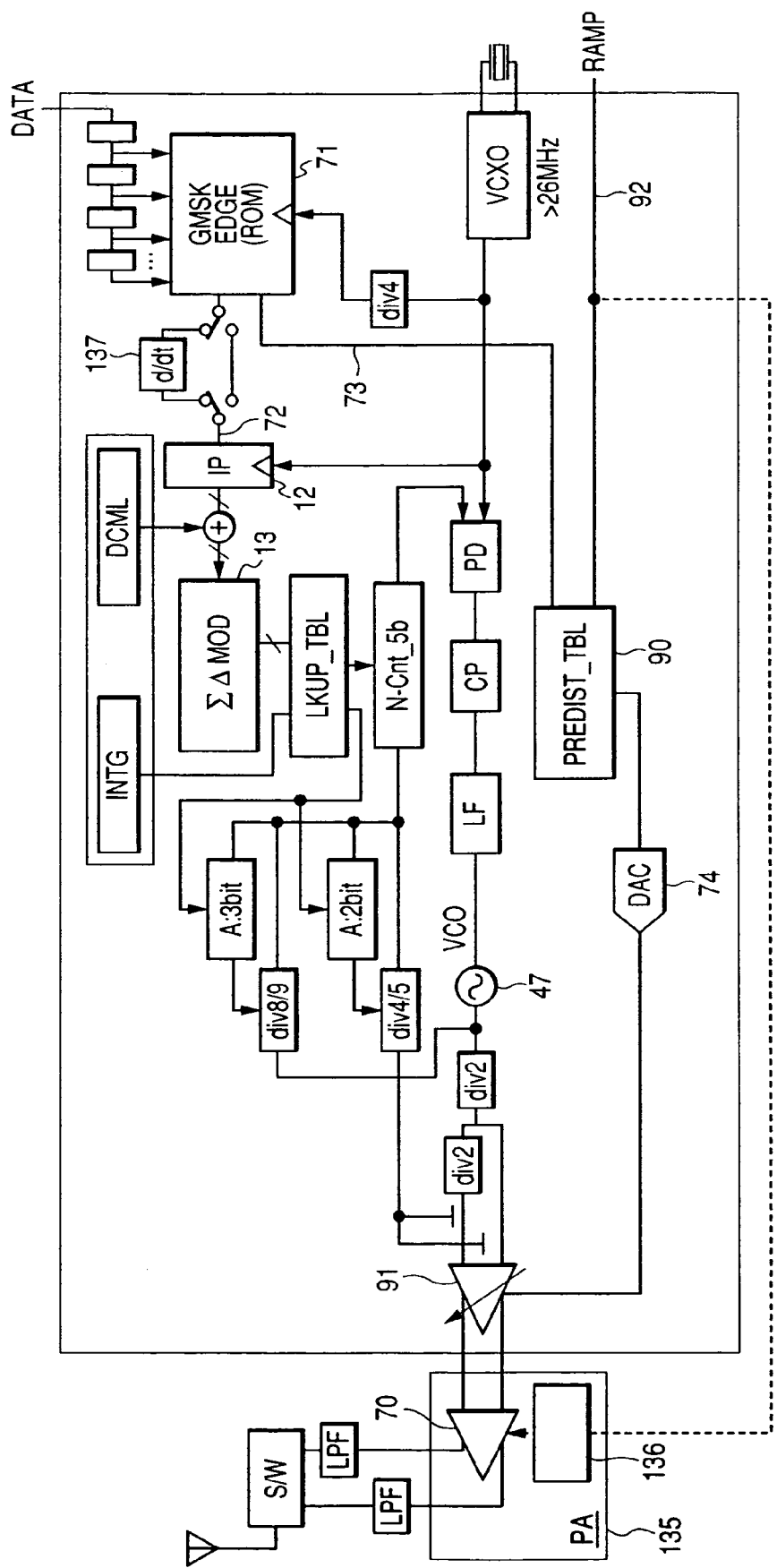
FIG. 14 shows the configuration of a transmitter, which is a sixth preferred embodiment of the invention.
Figure 15:
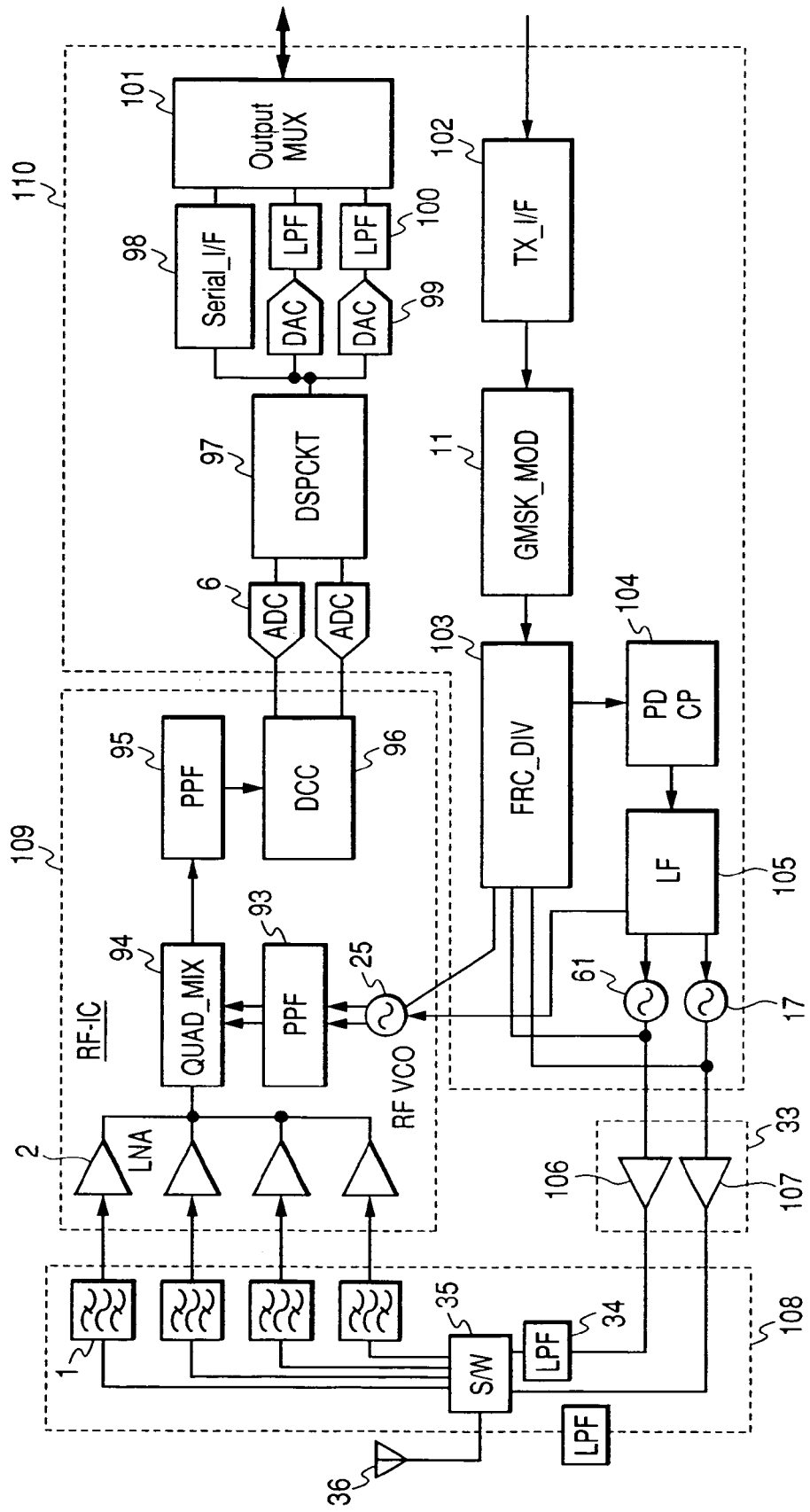
FIG. 15 shows the configuration of a transceiver according to the prior art.

Embodiment 6 of the present invention will be described below with reference to FIG. 14. In this embodiment, amplitude modulation is realized with an open loop. While the phase signal is processed in the same way as in Embodiments 4 and 5, open loop control is performed for amplitude modulation.

In the ROM 71 driven with binary data signals, data for GMSK and data for EDGE are stored as in Embodiment 5, to be selected as appropriate for a given operation. A signal for EDGE operation is split into phase information 72 and amplitude information 73, and the amplitude signal 73, after a power amplifier on/off signal (RAMP signal) 92 is added to it, is converted by the DA converter 74 into an analog signal via a pre-distortion table (PREDIST_TBL) 90, which is a table of distortion characteristics reverse to the non-linear characteristics of the variable gain amplifier, to control the gain of a variable gain amplifier 91. The variable gain amplifier, consisting of a differential amplifier for instance, reduces phase variations relative to the control voltage thereby to reduce phase errors even in open loop control. The power amplifier on/off signal can also be applied to a bias circuit 136 within a separate saturated power amplifier module 135 to control the power supply of the power amplifier itself, interlocked with the on/off state of the input signal to the power amplifier. In this embodiment, the amplitude control is applied to the variable gain amplifier on the high frequency integrated circuit 39, but it can as well be applied to the power amplifier where the characteristics of the power amplifier can be cancelled by the pre-distortion table 90. This embodiment enables open loop control to be applied to amplitude control and thereby to realize a transmitter adaptable to wide band signals.

Embodiment 7

Figure 16:
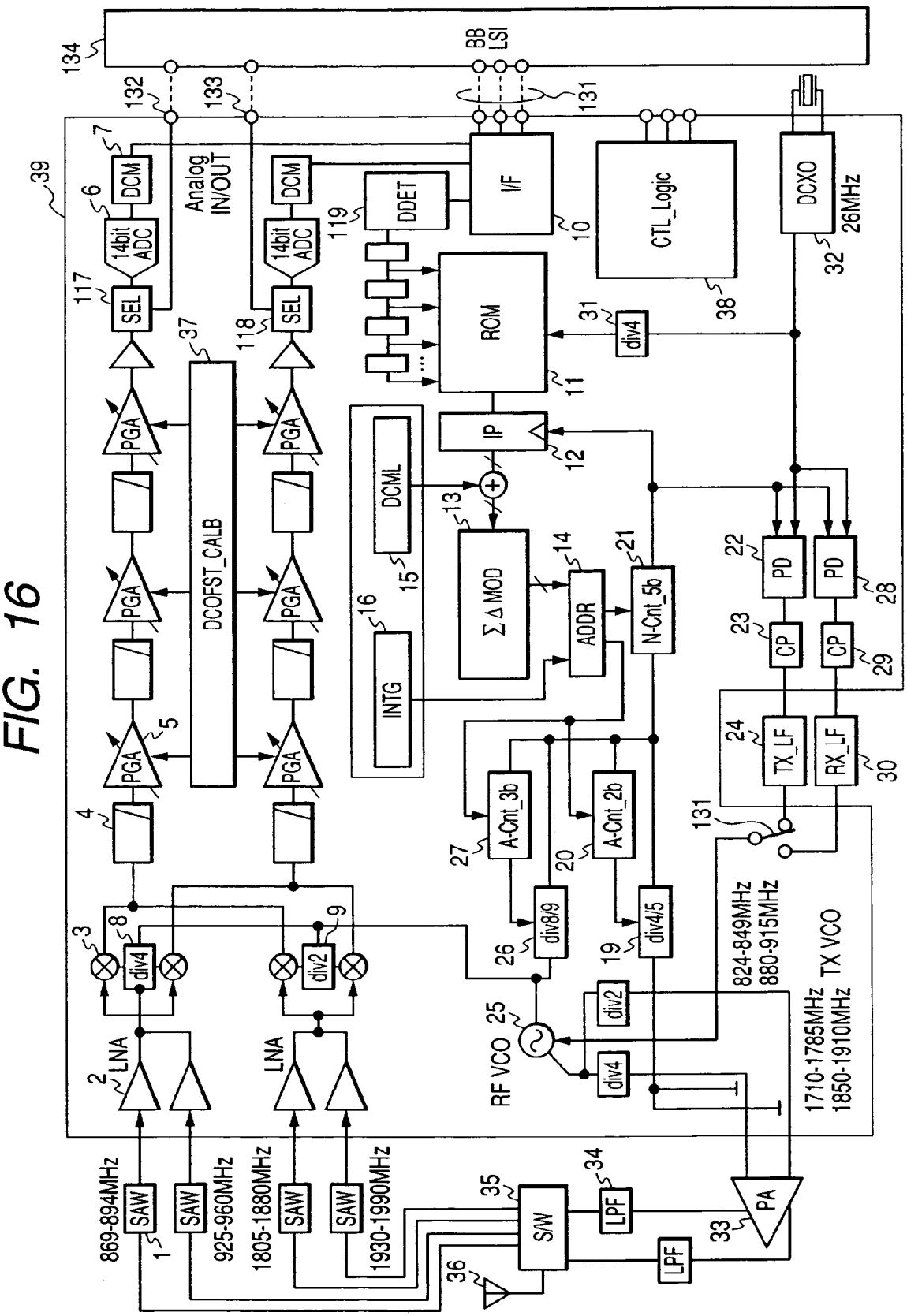
FIG. 16 shows the configuration of a ΣΔ transceiver, which is a seventh preferred embodiment of the invention.

Embodiment 7 of the present invention will be described below with reference to FIG. 16. This embodiment is adaptive to both cases including one in which an interface (I/F) between the high frequency integrated circuit 39 and a baseband (BB) processing LSI 134 is accomplished with digital binary data and the other in which it is accomplished with analog signals.

First will be described the operation of the receiver of this embodiment. In the receiver, there are provided selectors (SEL) 117 and 118 for changing over between the AD converter 6 and the amplifier stage. When an interface of the baseband processing LSI is to be accomplished with analog signals, the output of the amplifier stage is caused by the selectors to be directly supplied from the high frequency integrated circuit 39 to convey an analog I signal 132 and an analog Q signal 133 to the baseband (BB) processing LSI. When an interface of the baseband processing LSI is to be accomplished with digital signals, the selectors are switched over to apply the output signal of the amplifier stage to the AD converter 6. Where an over-sampling type AD converter is used, high range noise is reduced by causing the signal to pass a decimation filter (DCM) 7 and at the same time the data rate is lowered. After that, the signal is converted into a desired format by the digital interface 10, and conveyed to the baseband processing LSI via a digital transmission line 131.

When the transmitter is to operate, it does so in the following sequence. First, when an interface is to be accomplished with analog signals, the I and Q analog signals 132 and 133 are inputted to the AD converter via the selectors 117 and 118 and converted into digital signals. The digitized I and Q signals are detected by a digital detector (DDET) 119 to be converted into binary signals, which are used as input data of the ΣΔ transmitter. When an interface is to be accomplished with digital signals, data converted into a desired format by the baseband processing LSI are captured via a digital transmission line 131, converted by the digital interface 10 into binary signals, which are used as input data of the ΣΔ transmitter. This embodiment enables transmit/receive data to be supplied and received to and from the baseband signal processing LSI in both analog and digital forms.

Embodiment 8

Figure 17:
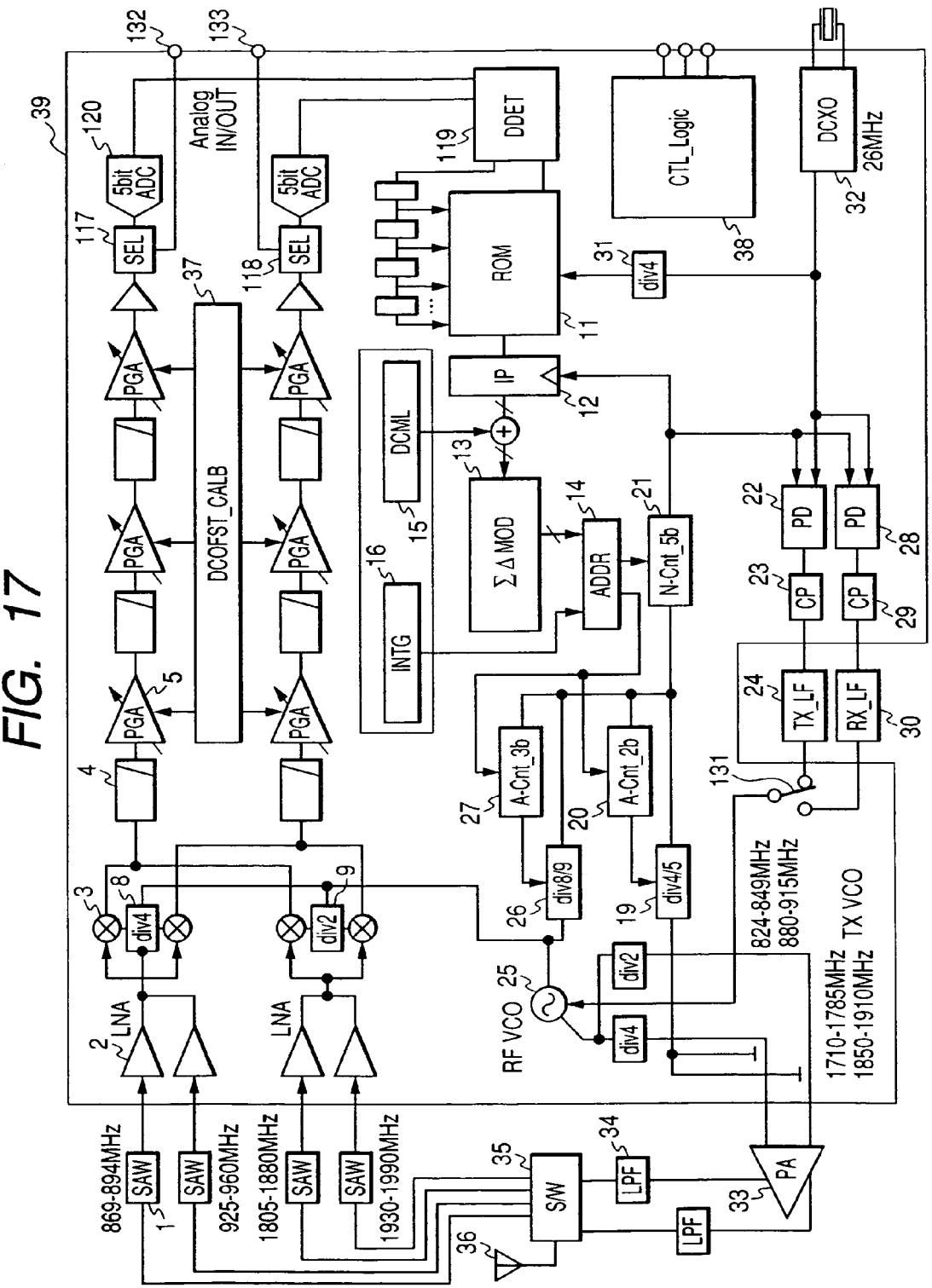
FIG. 17 shows the configuration of a ΣΔ transceiver, which is an eighth preferred embodiment of the invention.

Embodiment 8 of the present invention will be described below with reference to FIG. 17. This embodiment is an analog-dedicated version of Embodiment 7. When the receiver is to operate, signals of the amplifier stage are supplied directly out of the high frequency integrated circuit via the selectors 117 and 118 as in Embodiment 7. When the transmitter is to operate, the signals are inputted to the AD converter 120 via the selector 117 to be converted into digital signals. Since this AD converter 120 is dedicated to transmit signals, an ADC of low bit accuracy would be sufficient for the purpose. For instance, a 5-bit AD converter 120 would suffice in this embodiment though a 14-bit AD converter 6 is used in the configuration shown in FIG. 16. The digitized I and Q signals are detected by the digital detector (DDET) 119 to be converted into binary signals, which are used as input data of the ΣΔ transmitter, as in Embodiment 7. This embodiment enables a high frequency integrated circuit for transmission and reception, including a ΣΔ transmitter, to be adaptive to an analog interface.

What is claimed is:

1. A sigma delta transmitter to selectively output one output signal out of a plurality of output signals of a signal transmitting circuit which includes a buffer or a divider having a constant dividing ratio and to which an output of a first voltage controlled oscillator is connected, said sigma delta transmitter comprising:
a first phase comparator;
a first charge pump;
a first loop filter;
a first digital frequency limiter;
a first interpolator;
first and second data registers;
a first adder having the output of said first interpolator connected to its first input and the output of said first data register connected to its second input;
a first sigma delta converter, the output of said first adder being connected to an input thereof;
a second adder having the output of said first sigma delta converter connected to its first input and the output of said second data register connected to its second input;
a first variable divider, the output of said first voltage controlled oscillator is connected to an input thereof;
a first variable counter to which the output of said first variable divider is inputted; and
a second variable counter to which the output of said first variable divider is inputted,
wherein the output of said first variable counter is connected to the dividing factor switching terminal of said first variable divider,
wherein a superior digit of the output of said second adder is connected to the initial value setting terminal of said first variable counter and an inferior digit of the same is connected to the initial value setting terminal of said second variable counter,
wherein the output of said second variable counter is connected to the first input of said first phase comparator,
wherein the output of said first phase comparator is connected to the input of said first charge pump,
wherein the output of said first charge pump is connected to the input of said first loop filter, and
wherein the output of said first loop filter is connected to the control voltage input terminal of said first voltage controlled oscillator.

2. The sigma delta transmitter according to claim 1, further comprising:
a first waveform memory in which at least one item of sine waveform data is recorded, the output of said first digital frequency limiter and the output of said first waveform memory being connected via a first switch, which is selectively switched over, to the input of said first interpolator; and
a driving current switching circuit which switches over the driving current level of said first charge pump according to the detection output of a detector for detecting the voltage level of said first loop filter.

3. A sigma delta transceiver comprising a sigma delta transmitter and a first receiver,
wherein said sigma delta transmitter is configured to selectively output one output signal out of a plurality of output signals of a signal transmitting circuit which includes a buffer or a divider having a constant dividing ratio and to which an output of a first voltage controlled oscillator is connected,
wherein said sigma delta transmitter comprises:
a first phase comparator;
a first charge pump;
a first loop filter;
a first digital frequency limiter;
a first interpolator;
first and second data registers;
a first adder having the output of said first interpolator connected to its first input and the output of said first data register connected to its second input;
a first sigma delta converter, the output of said first adder being connected to an input thereof;
a second adder having the output of said first sigma delta converter connected to its first input and the output of said second data register connected to its second input;
a first variable divider, the output of said first voltage controlled oscillator is connected to an input thereof;
a first variable counter to which the output of said first variable divider is inputted; and
a second variable counter to which the output of said first variable divider is inputted,
wherein the output of said first variable counter is connected to the dividing factor switching terminal of said first variable divider,
wherein a superior digit of the output of said second adder is connected to the initial value setting terminal of said first variable counter and an inferior digit of the same is connected to the initial value setting terminal of said second variable counter,
wherein the output of said second variable counter is connected to the first input of said first phase comparator,
wherein the output of said first phase comparator is connected to the input of said first charge pump,
wherein the output of said first charge pump is connected to the input of said first loop filter,
wherein the output of said first loop filter is connected to the control voltage input terminal of said first voltage controlled oscillator,
wherein said first receiver comprises:
a second voltage controlled oscillator;
at least one divider having a constant dividing ratio connected to said second voltage controlled oscillator;
a third variable divider;
a third variable counter;
a second charge pump;
a second loop filter; and
a second phase comparator,
wherein the output of said divider having a constant dividing ratio is supplied as local signals of a plurality of mixers within said first receiver which receives a plurality of frequencies,
wherein the output of said second voltage controlled oscillator is connected to the input of said second variable divider,
wherein the output of said second variable divider is connected to the input of said third variable counter,
wherein the output of said third variable counter is connected to the dividing factor switching terminal of said second variable divider,
wherein the output of said second variable divider is connected to the input of said second counter,
wherein a superior digit of the output of said second adder is connected to the initial value setting terminal of said third variable counter, and an inferior digit of the same is connected to the initial value setting terminal said second variable counter,
wherein the output of said second variable counter is connected to a first input of said second phase comparator,
wherein the output of said second phase comparator is connected to the input of said second charge pump, wherein the output of said second charge pump is connected to the input of said second loop filter, and wherein the output of said second loop filter is connected to the control voltage input terminal of said second voltage controlled oscillator.

4. The sigma delta transceiver according to claim 3, wherein said first voltage controlled oscillator also serves as said second voltage controlled oscillator, wherein the output of said first voltage controlled oscillator is connected to said second variable divider, wherein said first phase comparator, said first charge pump and said first loop filter also serve as said second phase comparator, said second charge pump and said second loop filter, respectively, and wherein the driving currents and frequency characteristics of said first charge pump and of said first loop filter are variable.

5. The sigma delta transceiver according to claim 4, wherein said sigma delta transceiver is integrated as an integrated circuit, and further comprises a digital signal converter which converts receive signals received by said first receiver into digital receive signals, and wherein the input signals of said first digital frequency limiter and said digital receive signals are transmitted and received to and from outside the integrated circuit via a bi-directional digital transmission path.

6. The sigma delta transceiver according to claim 3, wherein said first voltage controlled oscillator also serves as said second voltage controlled oscillator, wherein the output of said first voltage controlled oscillator is connected to said second variable divider, and wherein the output of either one of said first and second loop filters is selectively connected by a first switching circuit to the control voltage input terminal of said first voltage controlled oscillator.

7. The sigma delta transceiver according to claim 6, wherein said sigma delta transceiver is integrated as an integrated circuit, and further comprises a digital signal converter which converts receive signals received by said first receiver into digital receive signals, and wherein the input signals of said first digital frequency limiter and said digital receive signals are transmitted and received to and from outside the integrated circuit via a bi-directional digital transmission path.

8. The sigma delta transceiver according to claim 3, wherein said sigma delta transceiver is integrated as an integrated circuit, and further comprises a digital signal converter which converts receive signals received by said first receiver into digital receive signals, and wherein the input signals of said first digital frequency limiter and said digital receive signals are transmitted and received to and from outside the integrated circuit via a bi-directional digital transmission path.

9. A sigma delta transmitter comprising:

a first digital encoder;

a first digital frequency limiter;

a first frequency conversion and polar coordinate transfer circuit for executing both first center frequency conversion and polar coordinate transfer;

a first variable delay circuit;

a first power amplifier;

a first amplitude detector;

a first amplitude comparator;

first and second integrators;

a first differentiator;

a first equalizer;

a delay circuit;

a first filter;

a first phase synchronizer which involves a first voltage controlled oscillator and whose dividing ratio is variable; and a first limiter-amplifier, wherein the output of said first digital encoder is connected to the input of said first digital frequency limiter, wherein the output of said first digital frequency limiter is applied to said first frequency conversion and polar coordinate transfer-circuit, wherein the phase output of said first frequency conversion and polar coordinate transfer circuit is connected to said first variable delay circuit, wherein the output of said first variable delay circuit is connected to the input of said first power amplifier, wherein the output of said first power amplifier is connected to the input of said first amplitude detector, wherein the level of the amplitude output detected by said first amplitude detector and that of the amplitude output of said first frequency conversion and polar coordinate transfer circuit are compared by said first amplitude comparator, wherein the output of said first amplitude comparator is integrated by said first integrator, wherein the output of said first integrator is connected to the variable output level terminal of said first power amplifier, wherein the output of said first power amplifier is connected to the input of said first limiter-amplifier, wherein the product of multiplication of the output of said first limiter-amplifier by the phase signal output of said first frequency conversion and polar coordinate transfer circuit is integrated by said second integrator, and wherein the output of said second integrator is applied to the delay control input terminal of said first variable delay circuit.

10. The sigma delta transmitter according to claim 9, wherein the phase output of said first frequency conversion and polar coordinate transfer circuit is connected to the input of said first differentiator, wherein the output of said first differentiator is connected to the input of said first equalizer, wherein the output of said first equalize is connected to the dividing factor control terminal of said first phase synchronizer, wherein the amplitude output of said first frequency conversion and polar coordinate transfer circuit is connected to the input terminal of the delay circuit, wherein the output of said delay circuit is connected to the input of said first filter, and wherein the output of the voltage controlled oscillator within said first phase synchronizer serves as the phase signal output and the output terminal of said first filter serves as the output terminal for amplitude signals.

* * * * *